INVENTOR
T.N. LOWRY
BY
William H. Kamstra
ATTORNEY

Jan. 25, 1966 T. N. LOWRY 3,231,679

TELEPHONE SWITCHING NETWORK

Filed June 28, 1962 8 Sheets-Sheet 4

Jan. 25, 1966 T. N. LOWRY 3,231,679

TELEPHONE SWITCHING NETWORK

Filed June 28, 1962 8 Sheets-Sheet 5

United States Patent Office 3,231,679
Patented Jan. 25, 1966

3,231,679
TELEPHONE SWITCHING NETWORK

Terrell N. Lowry, New York, N.Y., assignor to Bell Telephone Laboratories, Incorporated, New York, N.Y., a corporation of New York Filed June 28, 1962, Ser. No. 205,920
41 Claims. (Cl. 179—18)

This invention relates to telephone switching networks, and particularly to the control of such networks when adapted for use in electronic telephone switching systems.

Telephone switching networks of the character related to the present invention comprise a number of switches arranged in stages to provide transmission interconnections between any one of a plurality of transmission terminals at one side of the network and any one of a plurality of transmission terminals at the other side of the network. The switching network may in this manner be employed to connect a subscriber line corresponding to the terminal at the one side of the network to a subscriber line or trunk corresponding to the terminal at the other side of the network. The switches which are ultimately operated to establish each of the connections in the various stages of the transmission network to complete a desired transmission path conventionally comprise a coordinate array of crosspoints having an electrical contacting means at each of the crosspoints. Electrical contacting means which may be employed in a crosspoint switch to establish transmission path connections take various forms and a number of these are well known in the telephone switching art. Mechanical arrangements for operating the contacting means have proven highly useful in the past and have been extensively employed. Electronic means such as gas tubes, for example, have also been employed for completing transmission path connections. This invention concerns itself particularly with the control of those switching devices in which metallic contacts are actually operated, such as electromechanical relays having contacts associated therewith. Switching network arrangements using well known electromechanical relay means have long constituted the basic contacting means for selectively completing a telephone network transmission path in certain telephone systems.

The time required for electromechanical relays to respond to energizing current pulses, however, has proven excessive in the context of high speed electronic switching systems. Accordingly, a need was created for an electrical contacting means which is operative responsive to electrical pulses occurring at electronic speeds. A highly advantageous answer to this need, fulfilling the requirement of high operating speeds while retaining the advantages inherent in a mechanical switch, is the contacting device known as a ferreed. One form of the ferreed is described in the patent of the present inventor, No. 3,037,085 issued May 29, 1962. This ferreed comprises in its simplest form a pair of magnetically responsive electrical reed contacts associated with a magnetic structure having remanent magnetic properties. The ferreed is organized such that when a flux is induced in the magnetic structure in one direction by a current pulse applied to windings coupled thereto, the flux is closed through the electrical reed contacts themselves thereby causing their closure. The remanent properties of the structure maintain the contacts closed after the energizing current pulse which induced the flux therein is interrupted. The contacts are opened by a reverse current pulse applied to another winding, which current pulse causes a reverse flux which closes through another portion of the magnetic structure rather than through the reed contacts. The spring action of the reed contacts then causes their separation.

The ferreed is thus wholly compatible with electronic telephone switching systems in which high speed energizing current pulses are applied to establish cross-point connections. Although a disparity still may exist between the response time of the reed contacts and the time duration of the energizing current pulses, the magnetic structure, which may advantageously be fabricated of a ferrite material, provides an ideal buffer between these two occurrences. A control flux is readily induced or switched in the structure responsive to high speed pulses and remains, or "latches," to actuate the relatively slower operating contacts. The organization of the control windings of a ferreed may advantageously be such that when both of two control windings are energized in either direction the reed contacts are closed and remain closed, the contacts being opened when either one but not both of the windings are energized. Such a winding arrangement is also described in detail in the patent of the present inventor referred to hereinbefore in detail and makes possible this differential excitation of ferreeds. When ferreeds operating in the differential excitation mode are arranged in a coordinate crosspoint switch, energizing control conductors arranged in both sets of coordinates defining the crosspoints serially include therein the respective winding means of the individual ferreeds. The contacts of each ferreed may be arranged to interconnect transmission conductors discretely associated with the energizing control conductors which define the crosspoint location of the ferreed within the coordinate crosspoint switch. To close the contacts of a ferreed at a selected crosspoint of a switch, the two coordinate control conductors defining the selected crosspoint are simultaneously energized. The contacts of the selected crosspoint ferreed close in response to the energization of its two control winding means in its response time after the brief energizing current pulses are removed from the defining coordinate energizing conductors. When the differentially excited ferreeds are arranged in coordinate fashion, it is clear that each of the other ferreeds having a winding included in the control conductors will have only one of their two control winding means energized. In accordance with the differential excitation mode of operation, the contacts of each ferreed of a coordinate switch appearing in the energized coordinate which were previously closed will be restored to their normally open state, leaving operated only the contacts of the selected crosspoint ferreed. This operation of a ferreed switch array has been termed "destructive mark" operation. In the destructive mark switch as described in the aforementioned Patent No. 3,037,085, the selected coordinate control conductors are separately although simultaneously energized from separate energizing pulse sources.

A multistage network of ferreed switches may advantageously be made up having a plurality of switches in each stage and one such network arrangement is shown in the patent referred to in the foregoing. Considerably larger networks in which a more economical distribution of switches and their interconnecting links is realized may also be achieved using the ferreed as the basic electrical connecting means. In such larger networks, switching arrangements are provided which respond to signals from common control equipment which itself operates responsive to the subscriber's service requests. When such a common control equipment is employed in connection with an electronic switching system, more economical and efficient distribution of network components is made possible and the flexibility of the switching system is greatly increased. In large switching networks of the character contemplated the problem is presented of gaining access to the network itself and then controlling the network pulsing paths to establish the necessary transmission paths required by subscriber service requests. The network may also be required to perform various test functions and also, advantageously, when malfunctions are detected, to perform its own clearing operations.

When a relatively large number of transmission paths are to be controlled in a network, it has been found that a significant economic advantage may be realized by using electromechanical relay means to provide the access for control operations. Specifically, when wire spring relays are so employed the cost of a single relay contact is small when compared to the cost, for example, of a semiconductor device which would be required to perform the same control path establishing function.

It is an object of the present invention to provide a new and novel ferreed switching network, the access and control of which, although electronically controlled, are achieved by means of electromechanical relay means, thereby to realize improvements in network economy and flexibility not possible with prior switching networks.

Another object of this invention is to provide a new and improved switching network compatible with electronic telephone switching systems.

It is also an object of this invention to employ the bilateral electrical current properties of ferreed switching devices to provide a telephone switching network capable of performing a number of control operations with a minimum increase in network components.

It is a further object of this invention to provide a ferreed switching network having relay means for selecting and establishing a control path therethrough.

The foregoing and other objects of this invention are realized in one specific illustrative embodiment thereof which employs the aforementioned ferreed electrical contacting devices as the basic switching elements. As also mentioned previously, the ferreeds each have a pair of control winding sets coupled to a magnetic structure, both control winding sets of which must be energized to effect the closure of the ferreed contacts. In one use of the ferreed in this invention, two reed spring contact sets are provided in each ferreed to establish a connection between tip and ring transmission conductors from one stage of the parallel transmission network to the next. The basic crosspoint switch of the present invention is a coordinate array of such ferreeds. One of the control winding sets of each ferreed is connected in an energizing control conductor of one set of coordinates and the other control winding set of the same ferreed is connected in an energizing control conductor of the other set of coordinates. When a ferreed is operated, its contacts interconnect transmission conductors of the transmission network which are discretely associated with the energizing control conductors in which the windings of the ferreed are connected. A selected ferreed of the switch is then operated simply by coincidentally energizing the two coordinate control conductors defining the selected ferreed in the coordinate array. Obviously, and in accord with destructive mark operation, each of the other ferreeds occurring on the energized coordinate control conductors will have only one of the control winding sets energized and hence will be restored to the normal state causing its contacts to open if previously operated.

Each of the ferreed crosspoint switches of this invention advantageously makes use of the connection in the switch of the output end of each of the coordinate control conductors of one set of coordinates with the input end of each of the coordinate control conductors of the other set of coordinates by means of a common conducting bus. This ferreed switch arrangement is described in the copending application of W. S. Hayward, Jr., Serial No. 206,055, filed June 28, 1962, now Patent No. 3,110,772 issued November 12, 1963. Since a somewhat rigorous requirement of coincidence both in time and amplitude exists for the energizing current pulses required to operate the ferreed devices employed in this invention, the common conducting bus connecting the ends of the coordinate control conductors of a switch advantageously solves this problem. Thus, by simultaneously applying a current pulse to a selected control conductor of one set of coordinates and a ground potential, for example, to a selected control conductor of the other set of coordinates, an energizing circuit is defined which will include both of the winding sets of the selected ferreed appearing at the crosspoint defined by the selected coordinates. Obviously, in this manner the identical current pulse is applied to both winding sets of the selected ferreed. An absolute coincidence of time and pulse magnitude is thus insured.

Before proceeding to the general organization of this invention, it may be noted that all references are to a switching control network as distinguished from the telephone transmission network which the switching control network is intended to control. Thus the switching control network will be understood by one skilled in the art to control, by means of the tip and ring contact pairs of the ferreeds, transmission paths in a parallelling transmission network which may be, but is not necessarily, an image of the switching control network. However, since this invention concerns itself essentially with switching network control, the transmission network of a telephone system with which this invention may advantageously be adapted for use is not considered in detail herein nor is it fully shown in the drawing.

The ferreed crosspoint switches of this invention are organized in grid units in which a plurality of switches on one side have their output coordinate control conductors connected by means of a plurality of interswitch links to input coordinate control conductors of an equal plurality of switches on the other side of the grid. Coordinate transmission conductors discretely associated with the coordinate control conductors of the various switches may be interconnected by interswitch transmission conductors in a pattern similar to that of the interswitch links. Hereafter the term "link" is descriptive of a connection between coordinate control conductors, it being understood that interswitch transmission conductors may be provided in association with each interswitch link for connecting the coordinate transmission conductors associated with the coordinate control conductors connected by the interswitch link. The interswitch link connections are such that each switch on one side of the grid has access at one of its output coordinate control conductors with each switch on the other side of the grid. An illustrative control network according to this invention is further developed by multiplying a number of such grids in both directions to make up a supergrid array of grids. Two columns of grids are contemplated with a plurality of grids in each column. In this supergrid arrangement of grids, it is apparent that four columns of crosspoint switches will result, of which columns of switches in the present network will comprise the switching stages. The grids including the stage 1 and 2 switches and the grids including the stage 3 and 4 switches are interconnected by means of a plurality of intergrid links. The latter links connect the levels of the switches in such a manner that each grid of one column of grids has access to each grid of the other column of grids. Three sets of interstage links thus result which will be designated herein the A links, interconnecting the switches of stages 1 and 2, the B links, interconnecting the switches of stages 2 and 3, and the C links, interconnecting the switches of stages 3 and 4.

According to one feature of this invention each of the A, B, and C links has a relay contact included therein. The relay contacts of the links are associated with operating relays grouped according to links in a manner such that with the operation of selected relays in each of the groups corresponding to the A, B, and C links, a single conducting control path is established from one side of a selected switch of the first stage switches to the other side of a selected switch of the last stage switches. Such a single conducting control path is made possible by the connections at each of the stages of the coordinate control conductors to the common conducting busses as previously described. At the first stage side of the network each of the input coordinate control conductors is connected to a line control conductor which has a relay contact included therein for making the subscriber line selection. At the last stage side of the network each of the output coordinate control conductors is connected to a trunk control conductor which has a relay contact included therein for making the selection of trunks leading out of the network. In the ferreed network being generally described, the transmission conductors outgoing from the last stage of the parallelling transmission path network, which is not a part of this invention, for completing calls between a calling subscriber substation and the central office or a called subscriber within the same central office, are termed junctors. Thus, it will be appreciated by one skilled in the art that the illustrative control network according to this invention being described may comprise only one part of a telephone system for responding to subscribers service requests. Other control networks which may be identical to the one contemplated herein may thus be employed in the system to control the completion of call connections.

The first and second stages of the supergrid network of this invention comprise concentrator stages. The switches employed in the latter stages have their crosspoints arranged and the number of coordinate control conductors in each set of coordinates organized in a manner such that the number of incoming lines of the network is reduced by a predetermined factor at the output side of the second stage. In the illustrative embodiment of this invention being described, the number of lines incoming to the network are concentrated on a 4:1 basis. Specifically, the particular control network to be considered in detail hereinafter provides for the access of 4096 lines to 1024 transmission conductors at the output of the second stage.

It is also a feature of a control network according to the principles of this invention that a ferreed is also connected in each of the line control conductors at the first stage of the network; contacts of this ferreed may for example serve to disconnect, i.e., cut off, line supervisory circuits from the respective transmission conductors of the line circuits associated with the line control conductors. A special form of ferreed is employed at this point to provide for such cut-off operations. The ferrreed is provided with a single winding in order to achieve polar operation upon its selective energization. A current in one direction in the single winding thus serves to close the contacts of the polar cut-off ferreed and a current in the opposite direction opens the contacts. The polar ferreed of a particular line control conductor may be operated in conjunction with the exclusive control of the first stage switch to which the line control conductor is connected. The common conducting bus of each of the first stage switches itself provides an independent control circuit path by connecting thereto a shunt conductor leading to a potential source. The shunt conductor has also included therein a relay contact selectively operable to provide a shunt path directly to the latter potential through a particular control conductor of one coordinate without at the same time including in the path a control conductor of the other coordinate. As a result, although a control circuit is completed for the polar cut-off ferreed, the first stage switch is effectively opened with respect to the ferreeds appearing therein on the coordinate control conductor completing the circuit for the polar ferreed. Particular network operations may thus be accomplished in which a number of operative combinations of the cut-off polar ferreed and first stage switches are involved. Since the ferreeds of the supergrid switches are operable by current pulses of either polarity, network operations requiring the opening of the contacts of the first stage switches with or without the operation of the cut-off polar ferreed contacts are made possible without the addition of components or circuits within the network itself.

It is still another feature of this invention that at the junctor side of the network each of the junctor control conductors connected to the output coordinate control conductors of the last stage switches has one winding of a single ferreed device connected thereto. The contacts of this ferreed may be advantageously used to connect a test circuit to the transmission conductors associated with a junctor control conductor. This ferreed device, also operated in the differential excitation mode, is connected to the junctor control conductors between the control network and the aforementioned junctor selection relay contacts. The junctor ferreed advantageously provides for false, cross and ground testing of the particular network transmission path to which its contacts are connected. The bidirectional character of the current control paths defined through the supergrid ferreeds and the junctor ferreeds makes possible a variety of network control and test operations with or without the selective operation of the cut-off polar ferreed contacts.

According to yet another feature of this invention, each of the line control conductors, shunt conductors, A, B, and C links, and junctor control conductors of the control network, in addition to a relay contact, has a fuse connected therein. A self-clearing operation in the event of a sticking selection relay contact is in this manner advantageously made possible. It will be appreciated that, in a control network of the character contemplated, if a selection relay contact sticks closed, the one link control path in which the malfunctioning contact appears will remain in a busy condition and cannot be restored to an idle condition merely by releasing the relay involved. This defective condition is obviously more serious than the case of a contact which refuses to close since a false control connection thus established will interfere with other control connections. When the ferreed energizing current pulse is applied to the control network, the current will divide between the control paths thus existing. In accordance with this feature, all of the selection relays of the links except those of the particular group of links to be tested are closed. A direct current, sufficiently low in magnitude not to disturb operated ferreeds, is then applied to all of the junctor control conductors at the junctor side of the network. Since, in the particular group of links being tested, each of the selection relay contacts will be open, if one of these contacts is stuck closed, all of the direct current will be applied to the current path through the control network including the stuck contact. Although the testing current is of low magnitude, it is of sufficient duration to cause the fuse included in the latter path to melt, thus clearing the control path without in any way affecting the condition of the remaining control paths in the stage being tested. A subsequent continuity test may then be accomplished to isolate the now defective fuse and provide for its replacement and the correction of the stuck associated contact. Fuses of suitable characteristics may be provided to insure adequate operating margins.

The foregoing and other objects and features of this invention will be better understood from a consideration of the detailed description of a specific illustrative network embodiment thereof which follows when taken in conjunction with the accompanying drawing in which.

Figure 1:
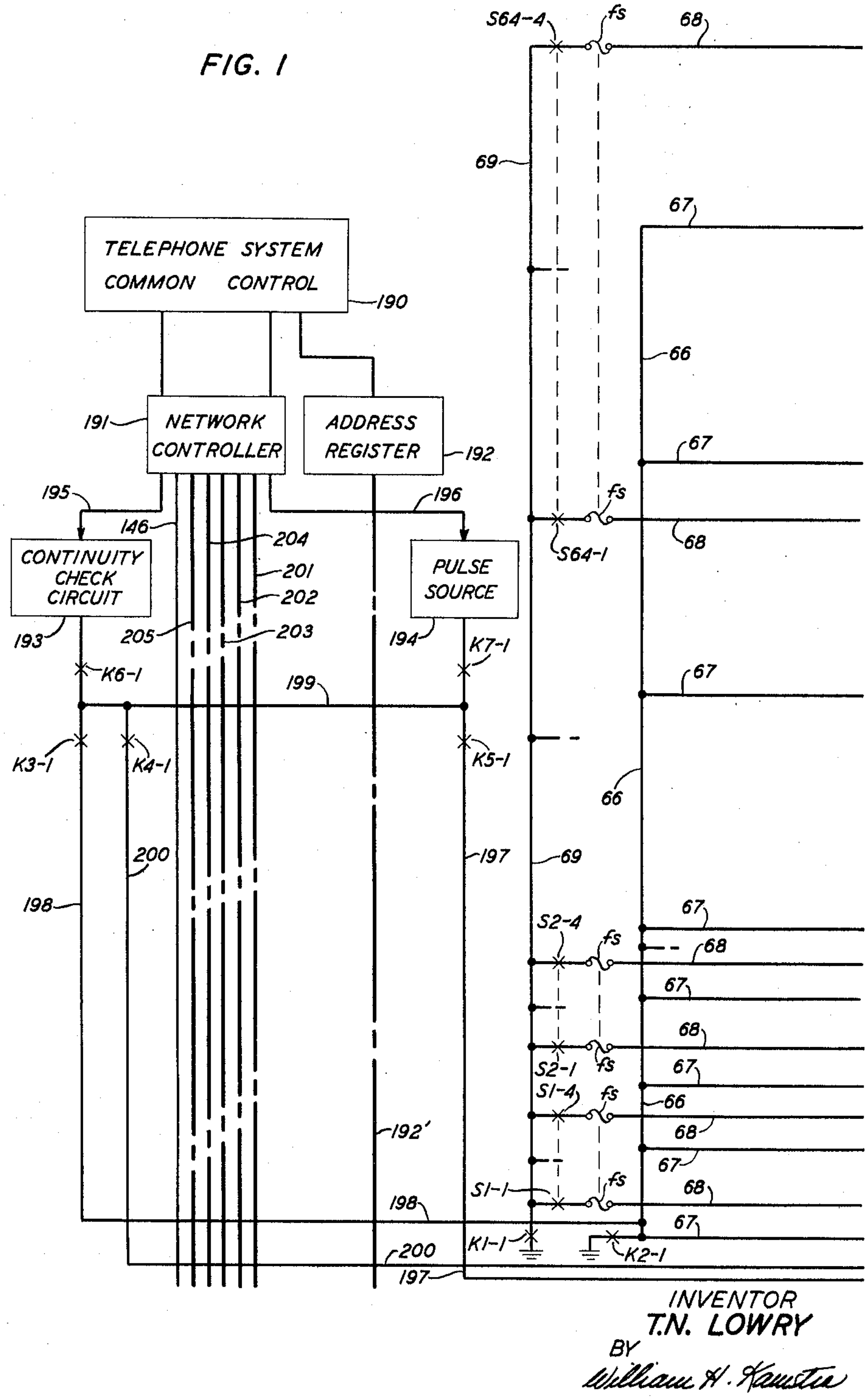
FIGS. 1 through 8 depict an illustrative telephone switching control network according to the principles of this invention.

An illustrative control network according to the principles of this invention may now be considered in detail with particular reference to FIGS. 1 through 8 of the drawing. The following description of such an illustrative network will comprise, first, the organization and structural arrangements of the control network, followed by a description of illustrative operations of the control network in accomplishing its various functions. The description of the structural organization of the control network will consider first the control network proper, its terminal circuitry, and interswitch link selection relay contacts, followed by a description of the various relay groups for controlling these and other contacts, the relay control circuits for accomplishing various network functions, and finally, general mention of the external circuitry which may advantageously comprise part of the telephone system as a whole with which a control network according to this invention may be adapted for use.

Broadly, the network comprises a supergrid made up of a plurality of columns of grids of ferreed switches. The switches are in this manner arranged in four stages. The stage 1 and 2 switches are arranged in a plurality of grids of switches, which grids in the specific embodiment being described number sixty-four. The stage 3 and 4 switches are also arranged in a plurality of grids, which grids number sixteen. For purposes of clarity the grids of the four stages will be designated A and C link grids hereinafter and, also to simplify the presentation in the drawing, only the last grid of each column of grids is shown in detail, the first and second representative grids being shown only in block symbol form. The first column of grids of the network thus comprises a plurality of A link grids 20–1 through 20–64 and the second column of grids of the network comprises a plurality of C link grids 30–1 through 30–16. The first two stages of the network are concentrator stages and the crosspoint arrangement of the ferreeds and the organization of the coordinate control conductors of the switches to achieve the required concentration is depicted in detail in the grid 20–64 shown in FIG. 2.

Each of the concentrator grids 20–1 through 20–64 is organized with four first stage switches 21–1 through 21–4 and four second stage switches 22–1 through 22–4. Each of the switches 21–1 through 21–4 comprises a partial access switch with sixteen input terminals at one side having access to four out of eight output terminals at the other side. Each of the switches 22–1 through 22–4 of the second stage comprises a switch having eight terminals at one side and four terminals at the other side. The organization of a first stage concentrator switch may be understood with particular reference to switch 21–1 of grid 20–64, for example. The switch 21–1 is provided with a plurality of input terminals $m_1$ through $m_{16}$ at one side connected to sixteen vertical coordinate control conductors of the switch. The latter control conductors are each connected at one end to a common conducting bus 23 in the manner described in detail in the copending application of Hayward, now Patent 3,110,772, mentioned hereinbefore. Eight horizontal coordinate control conductors are connected at one end also to the common conducting bus 23. In order to achieve concentration of the transmission paths, the individual ferreeds are arranged at the crosspoints of the switch 21–1 in a manner so that the transmission input paths corresponding to each of the terminals *m* may be connected via the ferreed contacts to any predetermined four of the eight transmission output paths corresponding to each of the terminals *n*; and the control windings are correspondingly connected between vertical and horizontal control conductors as shown in switch 21–1. Although any combinations of such connections may be devised by one skilled in the art, in the present illustrative embodiment, the terminals *m* are grouped by four such that the transmission conductors corresponding to any group of four terminals *m* may be connected to transmission conductors corresponding to a different combination of four horizontal conductors. These combinations of connections are represented in switches 21–1 and 21–4 in FIG. 2 by the encircled crosspoints of the switches, the ferreeds themselves being omitted for purposes of simplicity.

Figure 2:
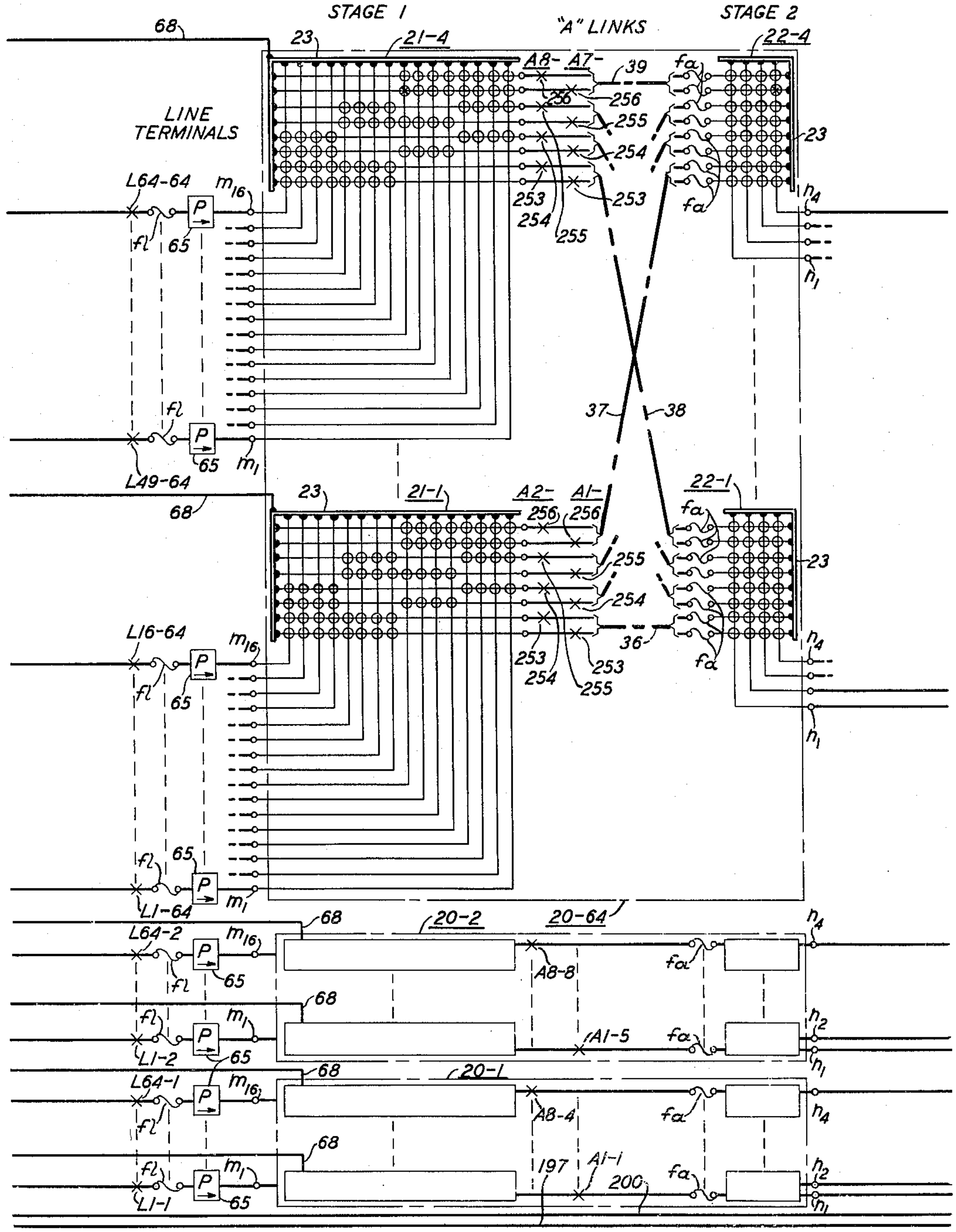
Figure 3:
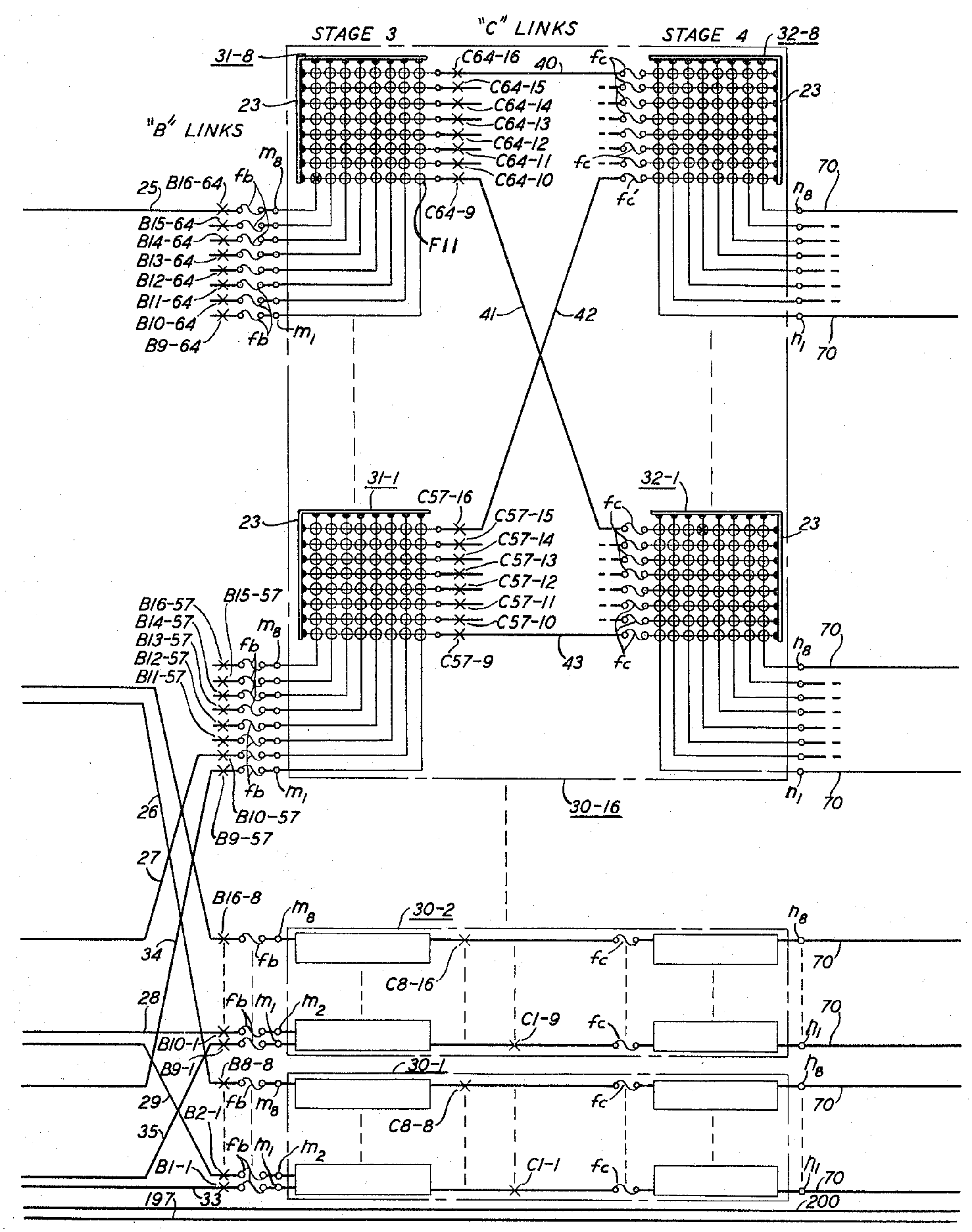
Figures 4, 10, 11:
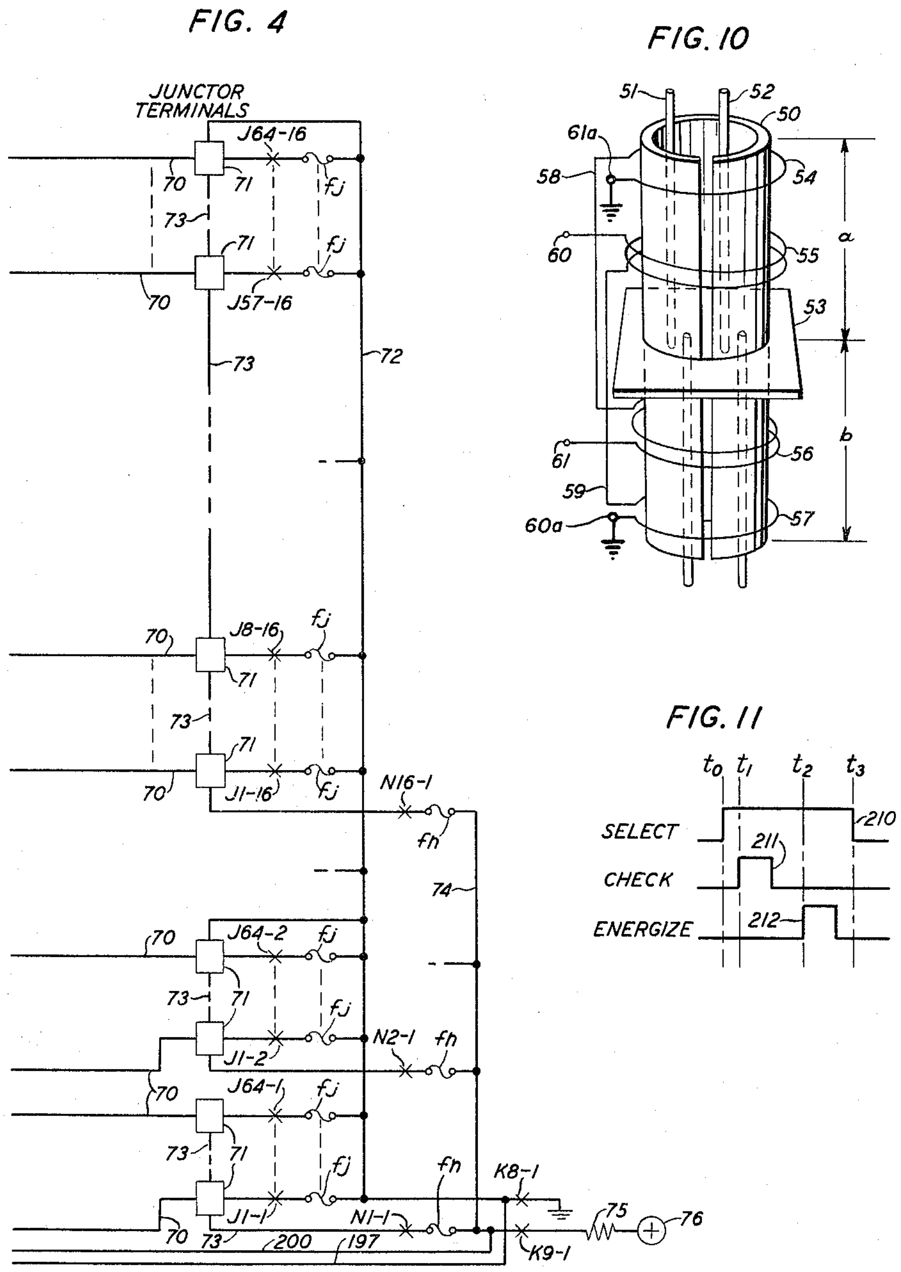
FIG. 10 depicts one ferreed crosspoint switch which may be employed as the basic electrical contacting means within the illustrative control network proper and its attendant transmission path network.
FIG. 11 depicts a comparison of various energizing pulses applied to the control network during various operations.
Figures 6, 9, 12, 13:
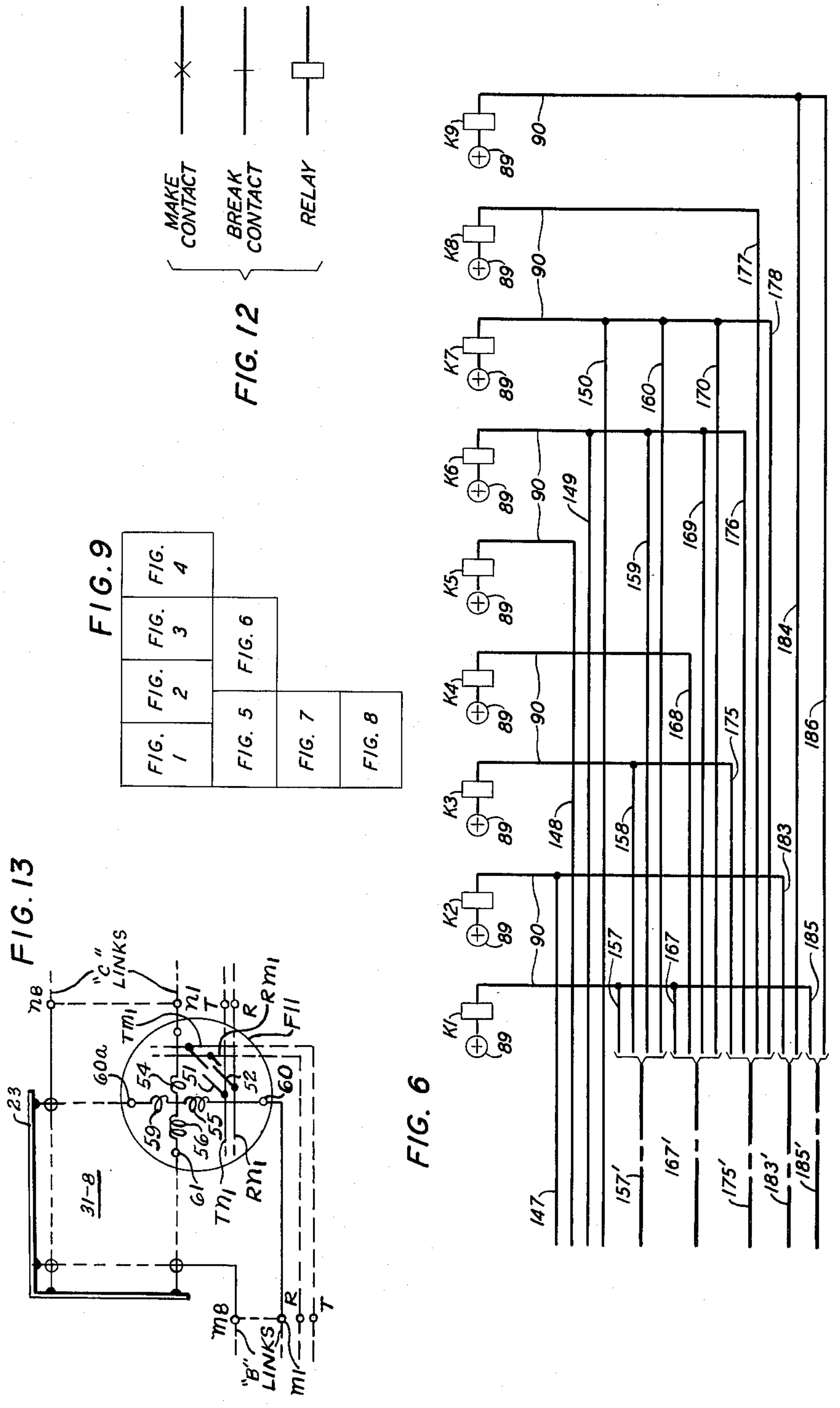
FIG. 9 shows the arrangement of FIGS. 1 through 8 to depict the control network organization.
FIG. 12 depicts the convention employed to represent relays and their associated *make* or *break* contacts.
FIG. 13 depicts the connection of a typical ferreed crosspoint within a coordinate switch array.

The connection of the ferreed device of FIG. 10 in a typical crosspoint switch array is shown in FIG. 13. Although the complete ferreed switch 31–8, part of which is shown in FIG. 13, appears in FIG. 3, the connections of the various ferreed terminals in the other switches 21, 22 and 32 of FIGS. 2 and 3 are identical to those shown in FIG. 13. The reed contacts 51 and 52 interconnect the transmission conductors $Tm_1$, $Rm_1$ and $Tn_1$, $Rn_1$ associated with the coordinate control conductors $m_1$ and $n_1$ respectively, when the ferreed device F11 is operated.

In the switches 22–1 through 22–4 a further step in the concentration of the grids 20–1 through 20–64 is achieved as may be described in connection with an illustrative switch 22–1. Eight horizontals of the latter switch have access to four verticals via the contacts of the individual ferreeds in this case provided at each of the crosspoints of the switch also as represented by encircled crosspoints only. The horizontal and vertical coordinate control conductors of the switch 22–1 are also connected at their ends, respectively, to a common conducting bus 23 in accordance with the switch described in the aforementioned Hayward application, now Patent 3,110,772.

Continuing with a consideration of a representative grid of the first and second stages, the interconnections of the A links between the horizontals of the switches 21–1 through 21–4 of the grid 20–64 and the horizontals of the switches 22–1 through 22–4 of the same grid may be merely stated at this point as each containing a relay contact and a fuse. In addition, the A links at this point may be understood as being associated in pairs to achieve the interstage connections. The A links will be considered in further detail hereinafter. It is to be understood that each of the grids 20–1 through 20–63 and their component ferreed switches are also organized in a manner identical to that described in connection with the representative grid 20–64.

The third and fourth stages of the network of FIGS. 1 through 8 comprise a plurality of sixteen grids 30–1 through 30–16. As depicted in detail in the representative grid 30–16, each of the latter grids is an octal grid having eight ferreed switches 31–1 through 31–8 in one of its stages and eight ferreed switches 32–1 through 32–8 in the other of its stages. Each of the ferreed switches of the latter stages is also organized on an octal basis, having eight vertical coordinate and eight horizontal coordinate control conductors. The respective ends of the control conductors lying on the coordinates are also connected to a common conducting bus 23 in each of the switches. In the case of the third stage switches, eight terminals $m_1$ through $m_8$ are provided for each switch which are connected to the eight vertical coordinate control conductors. For the fourth stage switches, eight terminals $n_1$ through $n_8$ connect to the eight horizontal coordinate control conductors. The provision at each of the crosspoints of the octal switches of the grid 30–16 is again represented merely by the encircled crosspoints at these locations. The connection of a typical ferreed device F11 in a typical ferreed switch 31–8 is shown in FIG. 13. C links, the specific interconnection of which will be described hereinafter, also connect the horizontal coordinate control conductors of the third stage switches with the horizontal coordinate control conductors of the fourth stage switches. Each of the interstage C links also has a relay contact and a fuse therein as will be considered in further detail hereinafter. It is to be understood that each of the other grids 30–1 through 30–15 and their component ferreed switches are also organized in a manner identical to that described in connection with the representative grid 30–16.

The A link grids and C link grids are interconnected by means of B links in a manner such that each of the A link grids has access to each of the C link grids. Although sixty-four A link grids are provided and only sixteen C link grids, a symmetrical interconnection of B links is made possible since, it will be recalled, the second stage of each of the A link grids is made up of four ferreed switches each having four outputs and the third stage in each of the C link grids is made up of eight ferreed switches each having eight inputs. In the illustrative network being described it is thus clear that 1024 aggregate terminals of the A link grids connect to 1024 aggregate terminals of the C link grids. With such an equal distribution of terminals of the A and C link grids, the terminals and their corresponding transmission conductors of an A link grid are successively connected, respectively, to the terminals and their corresponding transmission conductors of the C link grids which correpond to the numerical position of the connecting A link grid in the column of A link grids. For example, the last terminal of the A link grid 20–64, which is the terminal $n_4$ of the switch 22–4, connects via a B link 25 to the last terminal $m_8$ of the last switch 31–8 of the last C link grid 30–16. The first terminal of the A link grid 20–64, which is the first terminal $n_1$ of the switch 22–1, connects via a B link 26 to the last terminal of the last switch of the first C link grid 30–1. Likewise, continuing this successive interconnection of B links, the last terminal of the last ferreed switch of the second A link grid 20–2 connects via a B link 27 to the second terminal of the last C link grid 30–16, the latter terminal being the second terminal $m_2$ of the first switch 31–1. The second terminal of the second A link grid 20–2 then connects via a B link 28 to the second terminal of the C link grid 20–2. The first terminal of the second A link grid 20–2 connects via B link 29 to the second terminal of the first C link grid 30–1. Further representative connections of B links between the second and third stage switches will finally serve to illustrate the B link organization. The first terminal of the first A link grid 20–1 is connected via a B link 33 to the first terminal of the first C link grid 30–1 and the last terminal of the first A link grid 20–1 is connected via a B link 34 to the first terminal of the last C link grid 30–16. The second terminal of the first A link grid 20–1 is connected via a B link 35 to first terminal of the second C link grid 30–2. From the foregoing representative B link connections it is clear that with each A link grid having sixteen outputs, access may be had to each of the sixteen C link grids. Conversely, since each of the C link grids has sixty-four terminals, access to these terminals may be had from each of the sixty-four A link grids. Each of the B links, the representative ones 25 through 29, 33, 34, and 35 of which are shown in the drawing, also has a selection relay contact and a fuse therein, which elements will be considered in greater detail hereinafter.

The interconnections of the A links within each of the grids 20–1 through 20–64 is made in a manner similar to that described for the B links; that is, each of the switches 21–1 through 21–4 of the first stage has access via its horizontal control conductors to each of the switches 22–1 through 22–4 of the second stage. This interconnection may be understood with reference to the grid 20–64 shown in detail in FIG. 2. It may be noted, however, that, in distinction from the switches of the C link grids, the switches of each stage of the concentrator grids each have more horizontal control conductors than there are switches of the other stage to which it may have access. Accordingly, the horizontal control conductors of the switches 21–1 through 21–4 are connected in pairs via pairs of A links to pairs of horizontal control conductors of the switches 22–1 through 22–4. Specifically, the first two horizontal control conductors of the switch 21–1 are connected via a pair of A links, represented in FIG. 2 by a representative link 36, to the first two horizontal control conductors of the second stage first switch 22–1. The seventh and eighth horizontal control conductors of the first switch 21–1 of the grid 30–64, of that switch, respectively, which are the penultimate and last horizontal control conductors, are connected via pair of A links represented by the link 37 to the first and second horizontal control conductors of the second stage last switch 22–4. The first and second horizontal control conductors of the first stage last switch 21–4 are connected by a pair of A links 38 to the penultimate and last horizontal control conductors, respectively, of the second stage first switch 22–1 and the penultimate and last horizontal control conductors of the switch 21–4 are connected via a pair of A links 39 to the penultimate and last horizontal control conductor, respectively, of the second stage last switch 22–4. This sequence of interconnection is continued for the intermediate pairs of A links not shown in the drawing to avoid complexity of presentation. The pairing of A links and their paired connections between terminals of the grids advantageously makes possible the use of 8 x 4 switches in the second stage to achieve a correspondence of the number of horizontal control conductors and their paralleling transmission conductors of the third stage grids with the horizontal control conductors and their paralleling transmission conductors of the second stage grids. It is to be understood that each of the grids 20–1 through 20–63, not shown or shown only in block symbol form, has it switch interconnections made in a manner identical to that described in the foregoing for the grid 20–64.

Within each of the C link grids 30–1 through 30–16, the switch interconnections between switches are identical to that described between grids for the B links. Thus, within each C link grid, each of the switches 31–1 through 31–8 of the third stage has access, via one of its horizontal control conductors and a C link, with each switch within its grid of the fourth stage. Representative C links 40 through 43 are shown in FIG. 3 interconnecting representative horizontal control conductors of the switches of the grid 30–16. C link 40 thus connects the last horizontal control conductor of the third stage last switch 31–8 with the last horizontal control conductor of the last switch 32–8 of the fourth stage; C link 41 connects the first horizontal control conductor of the last switch 31–8 with the last horizontal control conductor of the first switch 32–1; C link 42 connects the last horizontal control conductor of the first switch 31–1 with the first horizontal control conductor of the last switch 32–8; and finally, C link 43 connects the first horizontal control conductor of the first switch 31–1 with the first horizontal control conductor of the first switch 32–1. Intermediate C links not shown to avoid complexity similarly connect the intermediate horizontal control conductors of the third and fourth stage switches to achieve the required access pattern, and their interconnection may be determined by interpolation. It is also to be understood that each of the grids 30–1 through 30–15, not shown or shown in block symbol form only, is organized with respect to its interconnecting C links, in a manner identical to that described for the illustrative grid 30–16.

The organization of an illustrative control network and its internal interconnections has thus been described, which network has 4096 line terminals at the first stage in 256 switch groups of sixteen $m_1$ through $m_{16}$ line terminals. The network also has 1024 junctor terminals at the fourth and last stage in 128 switch groups of eight terminals $n_1$ through $n_8$. Before proceeding to a description of the additional terminal circuitry for selecting a control path through the control network, the particular ferreed device contemplated for use as a crosspoint in the switches already considered will be described. Although the individual ferreeds may advantageously take the form of the differentially operating parallel ferreed shown and described in Patent No. 3,037,085 of the present inventor referred hereinbefore, any form of crosspoint switch operating in the coincident current excitation mode may be employed in the switches of a network according to this invention. One such alternative form of ferreed and one which is contemplated for use in the present network is the series ferreed shown in FIG. 10 and is also described in the copending application of A. L. Blaha et al., Serial No. 124,723, filed July 17, 1961, now Patent 3,075,059 issued January 22, 1963. The ferreed of FIG. 10 comprises a slotted magnetic sleeve 50 of a material having substantially rectangular hysteresis characteristics through which are passed magnetically responsive reed contact members. Since the switching network of this invention provides for the simultaneous completion of tip and ring transmission circuits, two reed contact member pairs 51 and 52 are provided in the ferreed. A magnetically permeable collar 53 encircles the sleeve 50 at approximately its midpoint and opposite the contacts of the reed members 51 and 52 within the sleeve. A portion *a* of the sleeve 50 has a winding 54 and a winding 55 thereon and portion *b* of the sleeve 50 has a winding 56 and a winding 57 thereon. The winding 54 is connected in series opposing with the winding 56 in an energizing circuit 58 and the winding 55 is connected in series opposing with the winding 57 in an energizing circuit 59; the relative sense of these energizing circuits is opposite, so that for similar polarities of exciting currents, windings 54 and 55 will produce opposing magnetic fields, as will windings 56 and 57. The windings 54 and 57 have a smaller number of turns than each of the windings 55 and 56 in accordance with the differential excitation mode of operation which may now be briefly described.

Since this mode of operation, it will be recalled, depends on the simultaneous energization of the two sets of control windings 54–55 and 56–57, it will be assumed that a positive current pulse is applied simultaneously to each of the circuits 58 and 59, specifically, to the respective terminals of these circuits designated 60 and 61, repectively. From the sense of the larger windings 55 and 56 and the polarity of the applied energizing current pulse it will be apparent that a remanent magnetization will be induced responsive thereto in the sleeve 50 which is upward as viewed in the drawing. This magnetization will be equally distributed along the series portions *a* and *b* of the sleeve 50 and will find closure through the magnetic reed contact members 51 and 52 thereby effecting their closure. The energizing pulse will also be applied to the oppositely wound windings 54 and 57 thereby generating a counter magnetomotive force to the force inducing the foregoing magnetization. However, the number of turns of the latter windings is determined such that this magnetomotive force is overridden by the force generated in the windings 55 and 56 having a larger number of turns. Advantageously, the remanent properties of the sleeve 50 permit the flux induced therein to operate on the relatively slower responding reed contact members 51 and 52 after the energizing current pulse is removed from the terminals 60 and 61. These remanent properties also maintain the contacts of the reed members permanently closed without further expenditure of power.

Release of the contacts is accomplished by applying an energizing current pulse to either one but not both of the energizing circuits 58 and 59. Assuming that a positive current pulse is applied to only the circuit 58 at the terminal 61, a magnetomotive force in the upward direction as viewed in the drawing will be generated in the winding 56 and such a force in the downward direction will be generated in the winding 54. In the portion *b* of the sleeve 50 to which the winding 56 is coupled, the magnetization is already upward as a result of the previously described operation, and accordingly no effective magnetic change takes place in this portion *b*. In the portion *a*, however, the previously induced magnetization is switched to the opposite direction. Since no energizing current pulse is being applied at this time to the circuit 59, no magnetomotive forces counter to those just described are generated in the windings 55 and 57. The flux closure of the oppositely directed magnetizations as a result of the single applied current pulse will now be through the shunting collar 53 and through individual ones of the reed contact member pairs. As a result, the magnetic poles at the contacts of the members 51 and 52 will be alike, thus causing their separation. It is thus apparent that when only one of the energizing circuits 58 and 59 is energized, the portions *a* and *b* will be left with opposing magnetizations, and in either case the contacts will open or remain opened. In actual practice the reed contact members of the ferreed device of FIG. 10 may advantageously be encapsulated in glass envelopes in order to provides contact protection. The series ferreed device of FIG. 10 is readily adapted to the coordinate crosspoint switches already described herein in connection with the network portions of FIGS. 2 and 3 as shown in FIG. 13 by, for example, connecting the terminals 60 and 60*a* in series with an energizing control conductor in one of the sets of coordinates and by connecting the terminals 61 and 61*a* in series with an energizing control conductor in the other set of coordinates. The reed contacts 51 and 52 are connected between the transmission conductors T$m_1$, R$m_1$ and T$n_1$, R$n_1$ associated with the respective coordinate control conductors $m_1$ and $n_1$ which define the ferreed crosspoint device F11. When the crosspoint device F11 is operated, the transmission conductors T$m_1$ and R$m_1$ are connected to the transmission conductors T$n_1$ and R$n_1$ respectively by the contacts 51 and 52. It will be appreciated by one skilled in the art that still other forms of differentially excited and coincidentally operated electrical contacting devices may be employed as a crosspoint device in the network of this invention. Further, a differentially excited and coincidentally operated ferreed such as described in detail in the foregoing may also be employed to perform other and different functions in a switching network. Thus, as will be described hereinafter, the ferreed of FIG. 10 may advantageously be employed with virtually no modification in the control network of this invention in conjunction with performing the FCG testing of the paralleling transmission network.

Returning to the description of the control network proper and particularly to the line side at the first stage thereof, the organization of the line selection circuits may now be considered. Each of the line terminals *m* of the grids 20–1 through 20–64 is connected via the winding of a polar cut-off ferreed 65, a fuse, and a line selection relay contact to a common conductor 66 by means of an individual line control conductor 67. The conductor 66 is connected through a pulse control relay contact to ground. Each of the common conducting busses 23 of each of the first stage switches 21–1 through 21–4 of each of the grids 20–1 through 20–64 is connected via a shunt conductor 68, a fuse, and a shunt relay contact to a common conductor 69, which latter conductor is in turn connected to ground through another pulse control relay contact. The specific designations of the relay contacts so far mentioned, including those referred to as being included in the interstage connecting links together with the associated fuses, and the organization of the polar cut-off ferreeds will be considered in detail hereinafter in conjunction with the description of the selection relays with which the contacts are associated and the control of the cut-off ferreeds.

At the junctor side of the netwoork each of the junctor terminals *n* of the switches of the fourth stage are connected via a junctor control conductor 70, one of the winding sets of an FCG ferreed 71, a junctor selection relay contact, and a fuse to a common conductor 72, which latter conductor is in turn connected through one pulse control relay contact to ground and through another pulse control relay contact to pulsing conductor 199. The ferreeds 71 may advantageously each comprise a ferreed device identical to that depicted in FIG. 10. One of the winding sets of a ferreed 71 is connected in series with a junctor control conductor 70 and the other winding set of each of the ferreeds 71 is connected in a common conductor 73 individual to a C link grid. The contacts of a ferreed 71 may be arranged to connect a test circuit to the transmission conductors associated with a junctor control conductor 70 when the ferreed 71 is operated. One end of each of the common conductors 73 associated respectively with the C link grids is connected to the conductor 72. The other end of each of the common conductors 73 is connected via a no-test selection relay contact and a fuse to a common conductor 74. The latter conductor is connected via a pulse control relay contact and a resistance 75 to a source of positive potential 76.

It will be apparent from the illustrative control network of FIGS. 1 through 8 so far described, that by closing a selected relay contact in each of the A, B, and C links one exclusive series control path may be established in the control network between any one terminal *m* at the line side of the network and any one terminal *n* at the junctor side of the network. Thus, starting at the right side of the network as viewed in FIG. 3, such an exclusive control path may be traced from a selected *n* terminal, a vertical coordinate control conductor of a switch of the fourth stage, one of the control winding sets of a crosspoint ferreed, a common conducting bus 23, a horizontal coordinate control conductor of the same switch, the other control winding set of the same ferreed, a C link via its fuse and C link selection relay contact, a horizontal coordinate control conductor of a third stage switch, one of the control winding sets of a crosspoint ferreed, common conducting bus 23 of the same switch, a vertical coordinate control conductor, the other control winding set of the same ferreed, to a terminal *m* of the third stage switch. The exclusive control path is then continued via a B link, control winding sets of a crosspoint ferreed of a second stage switch, an A link and the control winding sets of a crosspoint ferreed of the first stage to a terminal *m* of an A link grid at the line side of the network. The exclusive series control path thus traceable may obviously be extended in both directions from the control network proper. Thus, at the line terminal side of the control network, the series control path may be further traced via the winding of a polar ferreed 65, a fuse, a line selection relay contact, and a line control conductor 67 to ground by means of the common conductor 66 and a pulse control relay contact. At the junctor side of the network the exclusive control path may be further extended to the common conductor 72 via a fuse, a junctor selection relay contact, one of the control winding sets of a ferreed 71, and a junctor control conductor 70.

In addition to the exclusive series control paths available through the control network as above illustrated, other such control paths are also available at either end of the control network. At the line terminal side of the network, for example, an alternative control path is available which may be traced via the winding of a polar ferreed and a first stage switch alone. Starting at the common conductor 66, such a control path follows a line control conductor 67, a line selection relay contact, fuse, and terminal *m* to a vertical coordinate control conductor of a switch of the first stage. At this point the latter control path is traced through the common conductor bus 23 of the same switch, a shunt conductor 68, fuse, and a shunt relay contact to the common conductor 69. Alternatively, the latter control path may be traced from the latter common conducting bus 23 and a horizontal coordinate control conductor of a switch of the first stage to continue its series path through the control network as previously described. Still another series control path may be traced from a horizontal coordinate control conductor of a first stage switch to its common conducting bus 23 and then directly to a connected shunt conductor 68, in this manner bypassing the vertical coordinate control conductors.

At the junctor side of the network a number of alternative circuits may also be traced. Thus, for example, a series control path extended through the control network itself may be traced therefrom either through a single control winding set of a ferreed 71 and thus to the common conductor 72, or through both control winding sets of a ferreed 71 via the common conductor 72 and a control conductor 73 to the common conductor 74. Each of the various series control paths so far mentioned is employed in performing various transmission network control operations as controlled by the operation of their associated control path selection relays. These relays and their contacts, which have so far only been generally referred to, and their energizing circuits may now be considered in detail. The energizing circuits of the relays will be grouped in general in accordance with particular operations of the control network.

Figure 5:
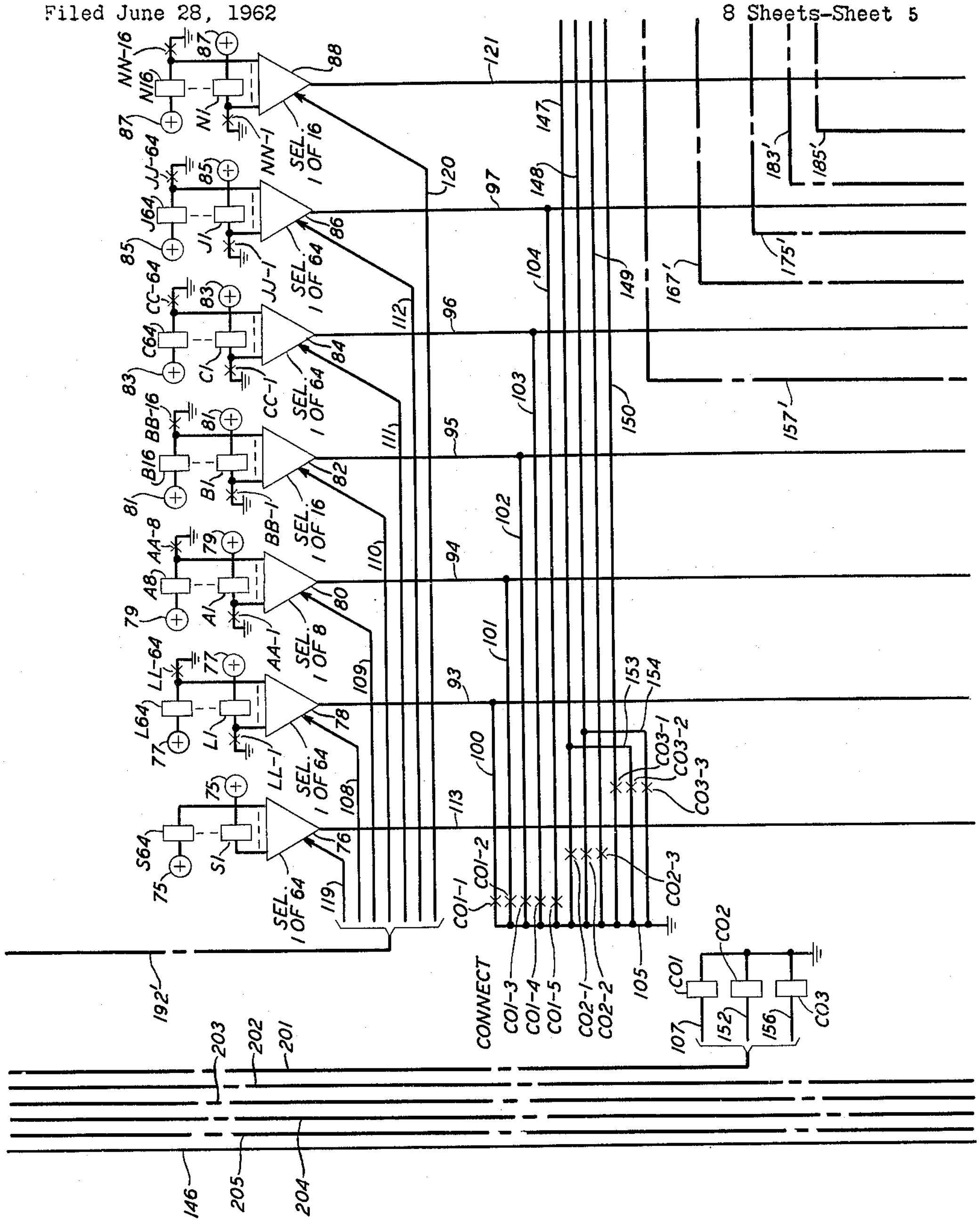

In FIG. 5 are shown the groups of relays required to select and establish the various series control paths through the control network and its terminal circuitry generally described in the foregoing. The groups of relays and their associated contacts will first be catalogued before considering in detail the circuits required for their control. The relays are group in accordance with the particular segments of the series control paths through the control network which they selectively established. Beginning at the line side of the network it will be recalled that each of the conducting busses 23 of the first stage switches is connected in a shunt circuit controlled by a shunt relay contact via a shunt conductor 68. A plurality of sixty-four relays S1 through S64, each having four contacts associated therewith, control establishment of these shunt circuit control paths. Each of the relays S1 through S64 is assigned to an individual A link grid and has one of its relay contacts connected in a shunt conductor 68 of a switch of its assigned A link grid. Specifically, the relay S1 assigned to the grid 20–1 has associated therewith and controls the contacts S1–1 through S1–4 connected in the four shunt conductors 68 of the four first-stage switches of the latter grid. The relay S2 has associated therewith and controls the contacts S2–1 through S2–4 connected in the four shunt conductors 68 of the four first-stage switches of the grid 20–2. This association of relays is continued with their contacts in the shunt conductors 68 to the last grid 20–64. At that point the relay S64 controls the contacts S64–1 through S64–4 connected in the four shunt conductors 68 of the first-stage switches 21–1 through 21–4. Each of the shunt relay contacts S1–1 through S64–4 has associated therewith a fuse *fs* also connected in its respective shunt conductor 68. Each of the relays S1 through S64 is connected at one side to a source of potential 75 and at the other side to a one-out-of-sixty-four selector switch 76.

Line selection at the line terminal side of the network is performed by a plurality of sixty-four relays L1 through L64 each having sixty-four contacts associated therewith. Each of the relays L1 through L64 has a line selection contact connected by means of a line control conductor 67 to a line terminal *m* of each of the grids 20–1 through 20–64. For example, the first contacts L1–1 through L64–1 of the relays L1 through L64, respectively, are connected in the line control conductors 67 connected through the windings of polar ferreeds 65 to the successive line terminals $m_1$ through $m_{16}$ of each of the switches of the A link grid 20–1. The second contacts L1–2 through L64–2 of the relays L1 through L64, respectively, are connected in the line control conductors 67 which in turn are connected through the windings of polar ferreeds 65 to the successive line terminals $m_1$ through $m_{16}$ of each of the switches of the A link grid 20–2. This successive assignment of line selection contacts is continued in this manner through the grids 20–3 through 20–63. At the grid 20–64, the last contacts L1–64 through L64–64 of the relays L1 through L64, respectively are connected, as shown in greater detail in the grid 20–64. to the successive line terminals of the first-stage switches 21–1 through 21–4. Specifically, the contacts L1–64 through L16–64, for example, are connected through windings of polar ferreeds 65 to the line terminals $m_1$ through $m_{16}$ of the switch 21–1. The line terminals $m_1$ through $m_{16}$ of the last first-stage switch 21–4 are connected through windings of polar ferreeds 65 to the contacts L49–64 through L64–64, respectively. Each of the line selection relay contacts L1–1 through L64–64 also has associated therewith a fuse *fl*. Each of the relays L1 through L64 is connected at one side to a source of potential 77. At the other side the latter relays are connected to a one-out-of-sixty-four selector switch 178. At the latter side the relays are also connected, respectively, to ground through a plurality of relay contacts LL–1 through LL–64, the purpose of which will be considered hereinafter in describing particular functions of the present control network.

Control path selection between the first and second stages, that is, the selection of the A links, is performed by a plurality of eight relays A1 through A8 each having associated therewith 256 contacts. The relays A1 through A8 are distributed among the A link grids in a manner such that, with respect to each A link grid, successive relay contacts of an odd and even numbered relay pair are alternated successively for the A link pairs within the grid. Since there are eight relays A1 through A8, and four switches within each of the stages of the A link grids, these relays are assigned in pairs to horizontal control conductors of the first-stage switches. Within any A link grid, the first two relays A1 and A2 are assigned to the odd and even horizontal control conductors, respectively, of the first first-stage switch; the second two relays A3 and A4 are assigned to the odd and even horizontal control conductors, respectively, of the second first-stage switch; the third two relays A5 and A6 are assigned to the odd and even horizontal control conductors, respectively, of the third first-stage switch; and the last two relays A7 and A8 are assigned to the odd and even horizontal control conductors, respectively, of the fourth first-stage switch. This distribution of A link relay contacts may be further demonstrated with respect to the A link grid 20–64 shown in detail in FIG. 2. In the first first-stage switch 21–1 of that grid, for example, relay A1 controls four contacts A1–253 through A1–256 in the first, third, fifth, and seventh horizontal control conductors and relay A2 controls four contacts A2–253 through A2–256 in the second, fourth, sixth, and eighth horizontal control conductors. This distribution may be continued to the last switch 21–4 of the grid 20–64 where the relay A7 controls four contacts A7–253 through A7–256 in the first, third, fifth, and seventh horizontal control conductors and relay A8 controls four contacts A8–253 through A8–256 in the second, fourth, sixth, and eighth horizontal control conductors. By means of this relay contact distribution a positive discrimination is obtained between the two links of the A link pairs within an A link grid. Each of the A link relay contacts associated with the relays A1 through A8 has associated with it, within its A link a fuse *fa*. The A link relays A1 through A8 are each connected at one side to a source of potential 79. At the other side the latter relays are connected to a one-out-of-eight selector switch 80. At the latter side the relays are also connected, respectively, to ground through a plurality of relay contacts AA–1 through AA–8, the purpose of which will also be considered hereinafter.

B link selection between the second and third stages of the network of FIGS. 1 through 8 is performed by a plurality of sixteen relays B1 through B16 each having associated therewith sixty-four contacts. The relays B1 through B16 are distributed among the terminals *m* of the C link grids in a manner such that the two relay groups B1 through B8 and B9 through B16 have their contacts assigned to alternating C link grids. The first contacts of each of the relays B1 through B8, for example, are connected to the terminals $m_1$ through $m_8$ of the first third-stage switch of the C link grid 30–1. These contacts are designated B1–1 through B8–1, respectively. With respect to the last third-stage switch of the grid 30–1, the contacts B1–8 through B8–8 of the relays B1 through B8, respectively, are connected to the terminals $m_1$ through $m_8$. Proceeding to the second C link grid 30–2, the relays B9 through B16 have their respective contacts 1 through 8 connected to the terminals $m_1$ through $m_8$ of each of the switches of that grid. Thus the contacts B9–1 through B16–1 of the relays B9 through B16, respectively, are connected to the terminals *m* of the first third-stage switch of the grid 30–2; the contacts B9–2 through B16–2 of the relays B9 through B16, respectively, are connected to the terminals *m* of the second third-stage switch of the grid 30–2; etc. This distribution may be continued by interpolation to the last third-stage switch of the grid 30–2 where the contacts B9–8 through B16–8 of the relays B9 through B16 are connected respectively to the switch terminals *m*. Proceeding in this alternate manner of assigning the relay groups B1 through B8 and B9 through B16 to adjacent C link grids to the last grid 30–16, the assignment of relays B9 through B16 and their relay contacts at the latter grid with respect to the detailed showing of the switches 31–1 and 31–8 is as follows: the contacts B9–57 through B16–57 of the relays B9 through B16, respectively, are connected to the terminals $m_1$ through $m_8$ of the first third-stage switch 31–1, respectively, and the contacts B9–64 through B16–64 of the relays B9 through B16, respectively, are connected to the terminals $m_1$ through $m_8$ of the last third-stage switch 31–8, respectively. The intermediate connections of the contacts of the relays B1 through B16 in the B links in each of the C link grids may readily be determined by interpolation from the representative contacts shown and described. Each of the B link relay contacts associated with the relays B1 through B16 has associated with it, within its B link, a fuse *fb*. The B link relays B1 through B16 are each connected at one side to a source of potential 81. At the other side the latter relays are connected to a one-out-of-sixteen selector switch 82. At the latter side the relays B1 through B16 are also connected, respectively, to ground through a plurality of relay contacts BB–1 through BB–16, the purpose of which will become apparent hereinafter.

Control of control path selection via the C links between the third and fourth stage switches is had by means of a plurality of sixty-four relays C1 through C64, each having sixteen contacts associated therewith. The relays C1 through C64 are assigned by groups to pairs of the C link grids 30–1 through 30–16 with the contacts of the relay groups successively assigned to the successive C links connected to the switches of the third stage. In the first C link grid 30–1 the contacts C1–1 through C1–8 of the relay C1 are connected to the horizontal control conductors of the first third-stage switch of this grid, the contacts C2–1 through C2–8 of the relay C2 are connected to the horizontal control conductors of the second third-stage switch of this grid, the contacts C3–1 through C3–8 of the relay C3 are connected to the horizontal control conductors of the third third-stage switch of this grid, etc. This contact assignment is continued to the eighth and last third-stage switch of the grid 30–1 with connection to the horizontal control conductors of this switch of the contacts C8–1 through C8–8 of relay C8. In the next C link grid 30–2 of the first pair of C link grids, contacts C1–9 through C1–16 of the relay C1 are connected to the horizontal control conductors of the first third-stage switch of this grid, contacts C2–9 through C2–16 of relay C2 are connected to the horizontal control conductors of the second third-stage switch of this grid, and so on to the eighth and last third-stage switch of this grid. At the latter switch of the grid 30–2 contacts C8–9 through C8–16 of the relay C8 are connected successively to its horizontal control conductors. This distribution of successive contacts of the same relay group to adjacent pairs of the C link grids is continued throughout the column of C link grids. At the last two C link grids 30–15 and 30–16, for example, the successive contacts of the relay group C57 through C64 are connected to the horizontal control conductors of their third-stage switches. Specifically, the contacts C57–1 through C57–8 are connected successively to the horizontal control conductors of the first third-stage switch of the grid 30–15, the contacts C58–1 through C58–8 are connected successively to the horizontal control conductors of the second third-stage switch of the grid 30–15, etc. The contacts C64–1 through C64–8 are then connected successively to the horizontal control conductors of the eighth third-stage switch of the grid 30–15. In the last grid 30–16, this distribution of contacts is continued with the connection of the contacts C57–9 through C57–16 of the relay C57 to the horizontal control conductors of the switch 31–1 shown in detail in FIG. 3. At the last switch 31–8 of the latter grid, contacts C64–9 through C64–16 of the relay C64 are successively connected to its horizontal control conductors. Each of the C link relay contacts associated with the relays C1 through C64 has associated with it within its C link a fuse *fc*. The C link relays C1 through C64 are each connected at one side to a source of potential 83. At the other side the latter relays are connected to a one-out-of-sixty-four selector switch 84. At the latter side the relays C1 through C64 are also connected, respectively, to ground through a plurality of relay contacts CC1 through CC64, the purpose of which will be described in detail hereinafter.

Junctor selection at the junctor side of the control network is accomplished by a plurality of sixty-four relays J1 through J64 each having sixteen contacts associated therewith. Each of the relays J1 through J64 has a junctor selection contact connected by means of a junctor control conductor 70 to a junctor terminal *n* of each of the grids 30–1 through 30–16. For example, the first contacts J1–1 through J64–1 of the relays J1 through J64, respectively, are connected in the junctor control conductors 70 connected through the FCG ferreeds 71 to the successive junctor terminals $n_1$ through $n_8$ of each of the fourth-stage switches of the C link grid 30–1. The second contacts J1–2 through J64–2 of the relays J1 through J64, respectively, are connected in the junctor control conductors 70 of the successive junctor terminals $n_1$ through $n_8$ of each of the fourth-stage switches of the C link grid 30–2. This successive assignment of junctor selection contacts is continued in this manner through the grids 30–3 through 30–15. At the grid 30–16, the last contacts J1–16 through J64–16 of the relays J1 through J64, respectively, are connected, as shown in greater detail in the grid 30–16, to the successive junctor terminals of the fourth-stage switches 32–1 through 32–8. Specifically, the contacts J1–16 through J8–16, for example, are connected via the junctor control conductors 70 to the terminals $n_1$ through $n_8$ of the switch 32–1. The junctor terminals $n_1$ through $n_8$ of the last fourth-stage switch 32–8 are connected through their respective junctor control conductors 70 to the contacts J57–16 through J64–16, respectively. Each of the junctor selection relay contacts J1–1 through J64–16 has associated therewith and also included in its junctor control conductor 70 of fuse *fj*. Each of the relays J1 through J64 is connected at one side to a source of potential 85. At the other side the latter relays are connected to a one-out-of-sixty-four selector switch 86. At the latter side the relays are also connected, respectively, to ground through a plurality of relay contacts JJ–1 through JJ–64, the purpose of which will also be considered hereinafter.

One final group of relays is provided to select a series control path through the control network proper. A plurality of sixteen no-test relays N1 through N16 each having a single relay contact associated therewith control the energizing paths through one of the control winding sets of the FCG ferreeds 71. The relays N1 through N16 are assigned to the C link grids 30–1 through 30–16, respectively. Thus, the single contacts N1–1 through N16–1 of the relays N1 through N16 are included in the energizing conductors 73 of each of the latter grids and thereby control the control paths through the latter conductors 73 to the common conductor 74 in turn leading to an energizing source. Each of the no-test relay contacts N1–1 through N16–1 has associated with it and also included in its conductor 73 a fuse *fn*. Each of the relays N1 through N16 is connected at one side to source of potential 87. At the other side the latter relays are connected to a one-out-of-sixteen selector switch 88. At the latter side the relays are also connected, respectively, to ground through a plurality of relay contacts NN–1 through NN–16, the purpose of which will become apparent hereinafter. The designation of the foregoing relays as "no-test" derives from an operation not described in connection with the present control network and the designation is employed only for the sake of consistency when the network is considered in a wider telephone system context.

In the foregoing description of control path selection relays and their contacts, in each case only a single relay with its contacts is described and shown in the drawing. It will be appreciated by one skilled in the art that such a single relay is assumed for purposes of simplicity of description only and in actual practice a number of relays may be ganged and operated simultaneously to accommodate, in some cases, the larger number of contacts to be controlled. In the actual practice of a control network according to this invention any suitable form of relay may be employed. In view of the considerable number of contacts associated with the relays, the well-known wire spring relay was found particularly advantageous and economical. The contacts of each of the relays so far described are *make* contacts and are shown in the drawing in accordance with conventional detached relay contact practice as depicted in FIG. 12. The selector switches 76, 78, 80, 82, 84, 86, and 88 referred to in the foregoing and the manner in which these switches are controlled will be considered in detail hereinafter.

In the foregoing the relays have been described, the selective operations of which control and establish the series of segments of a single series control path through the control network and its terminal circuitry. Before proceeding to a description of the energizing circuits for selectively operating the above relays, two additional groups of relays and their contacts will be considered. The first of these is effective selectively to steer the ferreed, energizing current pulses to the various control paths establishable in the control network and its terminal circuitry by the relays already described. The second group of relays is employed in the novel self-clearing operation of the control network according to this invention. In the first group of relays mentioned in the foregoing, nine pulse control relays K1 through K9, shown in FIG. 6, have single contacts distributed at various points throughout the network and its terminal circuitry. In the portions thereof so far described, for example, contact K1–1 of the relay K1 is connected in the common conductor 69 at the line terminal side of the network controlling its access to ground. Similarly, the contact K2–1 of the relay K2 is connected in the common conductor 66, also at the line terminal side of the network, controlling the access of the latter conductor to ground. At the junctor side of the network, the contacts K8–1 and K9–1 of the relays K8 and K9, respectively, are connected between the conductor 72 and ground, and between the conductor 74 and the resistor 75 with potential source 76, respectively. The remaining contacts of the relays K3 through K7 will be most conveniently described in connection with the address and relay selection circuitry to be considered hereinafter. Each of the relays K1 through K9 is connected at one side to a source of potential 89 and at its other side to an energizing conductor 90.

Figure 8:
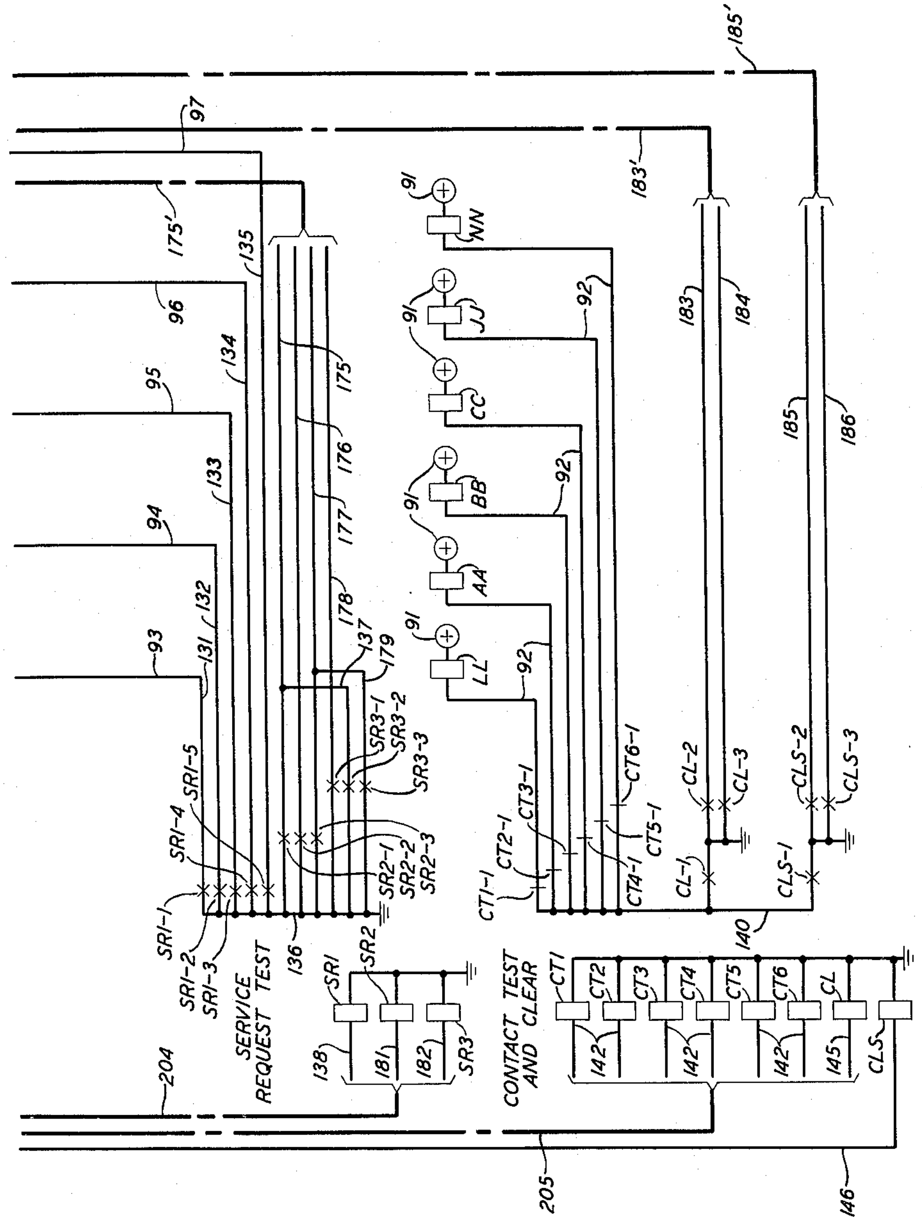

The second of the relay groups, shown in FIG. 8, which is the relay group operated for performing the self-clearing operation mentioned above, comprises a plurality of six clear relays LL, AA, BB, CC, JJ, and NN, The relay LL has sixty-four contacts LL–1 through LL–64 associated therewith. The latter contacts are included in auxiliary energizing circuits, respectively, for each of the relays L1 through L64 previously described and shown in FIG. 5. The relay AA has eight contacts AA–1 through AA–8 associated therewith, which latter contacts are included in auxiliary energizing circuits, respectively, for each of the relays A1 through A8 also shown in FIG. 5. The relay BB has sixteen contacts BB–1 through BB–16 associated therewith, which latter contacts are included in auxiliary energizing circuits, respectively, for each of the relays B1 through B16 of FIG. 5. The relays CC and JJ each have sixty-four contacts associated therewith. The contacts CC–1 through CC–64 are included in auxiliary energizing circuits for the relays C1 through C64, respectively, and the contacts JJ–1 through JJ–64 are included in auxiliary energizing circuits for the relays J1 through J64, respectively. The relay NN has sixteen contacts NN–1 through NN–16 associated therewith, which contacts are included in auxiliary energizing circuits for the relays N1 through N16, respectively. Each of the latter relays is also shown in FIG. 5. Each of the clear relays shown in FIG. 8 is connected at one side to a source of potential 91 and at its other side to an energizing conductor 92. Each of the contacts of the relays depicted in FIGS. 5 and 6 are also *make* contacts and each of the contacts and its relay are shown in the conventional detached relay contact presentation as were the selection relays previously described. Only single relays are shown in FIGS. 5 and 8 and it is also to be understood with respect to these relays that a number of relays may be ganged in each case to accommodate the considerable number of contacts operated.

Returning at this point to the various control circuits for selectively operating the control path selection relays already described, the relay control circuits for selecting and establishing a series control path through the control network responsive to a Connect order will first be considered. In order to establish such a control path, a line terminal, A link, B link, C link, and junctor terminal are selected. Connect order circuitry for operating the various relays for selecting these control path segments connects selected ones of these relays to ground through its selector switch. In the Connect order circuitry each of the selector switches 78, 80, 82, 84, and 86 is connected via common conductors 93 through 97 to corresponding selection conductors 100 through 104, respectively. The latter selection conductors are connected respectively through a plurality of *make* Connect order relay contacts CO1–1 through CO1–5 to a common ground conductor 105 to ground. The latter relay contacts are associated with a relay CO1 the energizing circuit of which terminates at one end on ground. The energizing circuit of the relay CO1 is completed at its other end via a conductor 107 which extends to a network controller circuit to be considered hereinafter. The selector switches 78, 80, 82, 84, and 86 may each comprise any well-known tree selector switch, or other form of selector switch capable of steering an energizing current pulse through a branching network under the control of address information signals applied thereto. Such selector circuit arrangements are well known in the art and accordingly, since they do not per se comprise inventive aspects of this invention, the selector switches are shown in block symbol form only. The foregoing selector switches receive address instructions via a plurality of address conductors 108 through 112 which extend to an address register of the network. Two other relays CO2 and CO3 are also operated during a Connect order operation of the control network; however these are more logically considered in connection with the circuitry for applying the actual ferreed energizing current pulses. Circuits for establishing a series control path through the network and its terminal circuitry for a Connect order may thus be traced to energize a selected one of each of the relays L1 through L64, A1 through A8, B1 through B16, C1 through C64, and J1 through J64 as follows: from ground at the common ground conductor 105, *make* contacts CO1–1 through CO1–5, selection conductors 100 through 104, common selector conductors 93 through 97, through the respective selector switches 78, 80, 82, 84, and 86, to the potential sources of the above-mentioned relays as selected by address signals transmitted to the selector switches via the address conductors 108 through 112, respectively.

Figure 7:
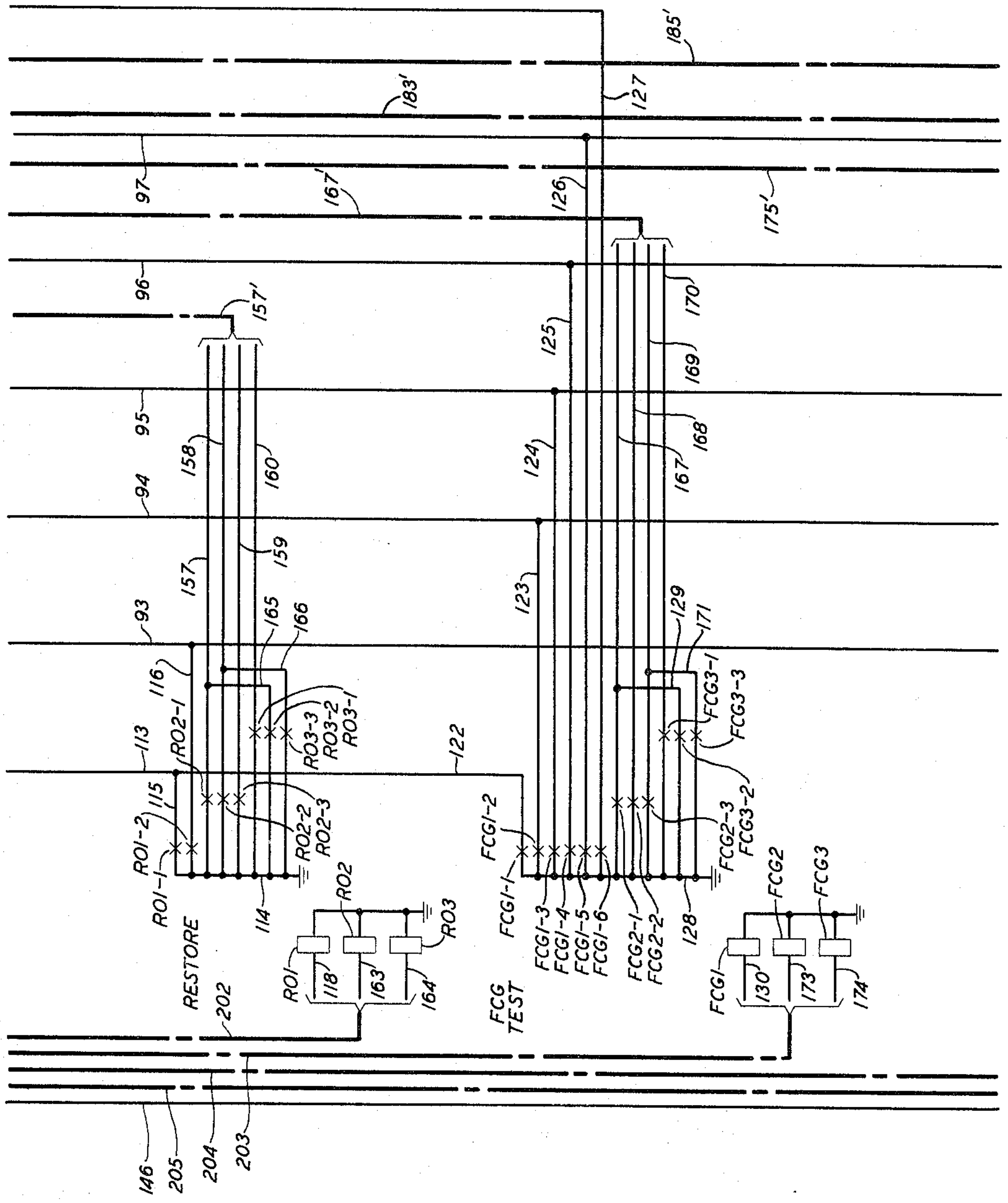

The next network operation, the control circuits of which will be described, is the Restore order for restoring supervision after a call has been completed. As will become apparent hereinafter, this network control operation involves only the switches of the first stage and the shunt selection circuits connected thereto. Accordingly, as depicted in FIG. 7, circuits are provided for setting up control path segments in these portions of the control network. The selector switches 76 and 78 associated with these portions of the network are extended to the Restore order control section by means of a conductor 113 and the conductor 93 previously described. Ground for selected relays of the selector switches 76 and 78 is extended via a common conductor 114, two *make* relay contacts RO1–1 and RO1–2, two selection conductors 115 and 116, and thereby through the respective conductors 113 and 93. The contacts RO1–1 and RO1–2 are controlled by a Restore order relay RO1, one side of which is connected to ground. The energizing circuit for the relay RO1 is completed via a conductor 118 to network controller circuits. Energizing paths from ground for a selected relay of the relay groups S1 through S64 and L1 through L64 as selected by address signals transmitted to the selector switches 76 and 78 via address conductors 119 and 108 may be traced as follows: from ground via the common conductor 114, relay *make* contacts RO1–1 and RO1–2, selection conductors 115 and 116, and thereby through the respective conductors 113 and 93 through the selector switches 76 and 78, respectively, to the potential sources 75 and 77 of the selected relays. Two other relays of this relay control circuitry are also of interest. However, since these relays RO2 and RO3 are operative only during the actual application of a ferreed energizing pulse, they will be more logically considered in conjunction with a description of the circuits for steering the latter energizing current pulse.

The next relay control circuitry to be considered is that for preparing the transmission network for a false cross and ground test. In this operation, ferreeds in the second, third, and fourth stages and an FCG ferreed are operated, switches in the first stage are to be left released and the cut-off ferreed left unchanged from its previous condition. In order to accomplish this selection operation one of the shunt selection relays S1 through S64, one of the A link selection relays A1 through A8, one of the B link selection relays B1 through B16, one of the C link selection relays C1 through C64, one of the junctor selection relays J1 through J64, and one of the no-test selection relays N1 through N16, are operated. The control circuit for selectively operating one relay of each of these relay groups comprises selector switches 76, 80, 82, 84, 86, and 88. Address control for the latter selector switches is extended from the network controller previously mentioned via the address conductors 119, 109, 110, 111, 112, and a conductor 120. Ground is extended through the foregoing selector switches for the selected relays via the conductors 113, 94, 95, 96, 97, and a conductor 121, respectively, which are extended to FIG. 7. The paths to ground are then continued respectively by means of the selection conductors 122 through 127, relay *make* contacts FCG1–1 through FCG1–6 included in the respective latter conductors, and a common conductor 128. The relay *make* contacts FCG1–1 through FCG1–6 are controlled by an FCG relay FCG1, which relay is connected at one side to ground and at the other side is extended via a conductor 130 to the network controller previously mentioned. Two other relays FCG2 and FCG3 are also included in this control circuitry and their operation will be considered hereinafter.

One other transmission network control operation which involves the same selection relays as were described in connection with the Connect order control circuitry is special service request simulation. In this operation the cut-off ferreed stage is active as are each of the network proper stages. The FCG ferreeds, on the other hand, are released. Accordingly, paths to ground for the selected relays are provided through the selector switches 78, 80, 82, 84, and 86 under the control of their associated address conductors via the common conductors connected to these selector switches previously described and which are now extended to FIG. 8. The latter conductors terminate at a plurality of selection conductors 131 through 135 which in turn are connected through a plurality of respective relay *make* contacts SR1–1 through SR1–5 to ground via a common ground conductor 136. The latter relay contacts are controlled by a relay SR1 which is connected at one side to ground and is extended via a conductor 138 to the previously mentioned network controller. Two other relays SR2 and SR3 also comprise a part of the control circuitry being described and these will be considered in conjunction with their operation hereinafter. Paths to ground for the selected relays of the foregoing selector switch groups may be traced along the conductors 93 through 97, selection conductors 131 through 135, relay contacts SR1–1 through SR1–5, respectively, to the ground conductor 136.

In the foregoing network control circuits described, each of the various relay contacts through which ground is extended is a *make* contact. In these control circuits the concern has been with establishing an exclusive series control path through the control network and its terminal circuitry. Combinations of the selector switches of FIG. 5 were involved in making this exclusive control path selection. In the final control network operation to be described hereinafter, the control path selection contacts are tested for any which may have stuck closed and the control path segment including such a contact is opened. For this purpose each of the stages and the terminal circuits of the control network are sequentially tested by closing all of the contacts of all of the latter stages except the contacts of the stage under test. The relay contacts in each of the auxiliary ground circuits of the path selection relays, such as, for example, the contacts LL–1 through LL–64, AA–1 through AA–8, etc., are provided for this purpose. These contacts are controlled by the relays shown in FIG. 8. The latter relays, LL, AA, BB, CC, JJ, and NN are connected to ground via their energizing conductors 92 through respective *break* contacts CT1–1 through CT6–1 and a common ground conductor 140. The latter contacts are controlled by a plurality of respective relays CT1 through CT6, one end of each of which is connected to ground and the other ends of which relays are connected via a plurality of conductors 142 to the previously mentioned network controller. The common ground conductor 140 is connected to ground at two points: at one point the connection is made through a relay *make* contact CL–1 of a clear relay CL and at the other point the connection is made through a relay *make* contact CLS–1 of a clear shunt relay CLS. The relays CL and CLS are connected at one side to ground and are extended via respective conductors 145 and 146 to the previously referred to network controller. Other contacts of both of the latter relays are connected in conductors the purpose of which will be described.

The description of the control path selection relay energizing circuits so far has concerned itself only with the selection and establishing of the series control paths through the control network and its terminal circuitry without mention of the circuits for directing energizing current pulses and potentials to these paths for performing the various transmission network control operations generally mentioned. It will be recalled that the pulse control relays K1 through K9 actually performed the operation of steering current to various parts of the control network for the performance of its various transmission network control functions. Various combinations of the latter relays are operated simultaneously with the selection relays already described and accordingly control circuits for the relays K1 through K9 are included in each of the selection relay control circuits described and traced in the foregoing. The description will thus return to each of these circuits to pick up the control of the pulse control relays K1 through K9 for actually applying the ferreed energizing current pulses and potentials.

Returning now to the Connect order control circuits of FIG. 5, four conductors 147 through 150 are seen to extend ground from the ground conductor 105 of FIG. 5 to the relays K2, K5, K6, and K7, respectively, of FIG. 6, through relay *make* contacts CO2–1, CO2–2, CO2–3, and CO3–1, respectively. The CO2 relay contacts are controlled by a relay CO2 connected at one side to ground and at the other side to a conductor 152 extended to the network controller mentioned previously. The conductors 147 and 148 are also connected to the ground conductor 105 via a pair of secondary conductors 153 and 154, respectively, having respective relay *make* contacts 154, respectively, having respective relay make contacts CO3–2 and CO3–3 therein. The latter relay contacts and the contact CO3–1 are controlled by a relay CO3 which is connected at one side to ground and at the other side to a conductor 156 extended to the abovementioned network controller.

In the Restore control circuits, the relays K1, K3, K6, and K7 are connected to the ground conductor 114 of FIG. 7 via a plurality of conductors 157 through 160, respectively, having included therein the relay *make* contacts RO2–1 through RO2–3 and RO3–1. The latter conductors are extended to the respective relays in FIG. 6 via a cable 157′. The latter relay contacts are controlled by relays RO2 and RO3 connected at one side to ground and at the other side to energizing conductors 163 and 164, respectively, which latter conductors are also extended to the previously mentioned network controller. The conductors 157 and 158 are also connected to the ground conductor 114 by means of secondary ground conductors 165 and 166, respectively, having therein relay *make* contacts RO3–2 and RO3–3 of the relay RO3.

During the false cross and ground test only the K relays K1, K4, K6, and K7 are operated and accordingly the source of potential 89 is connected to ground through each of these relays via a plurality of conductors 167 through 170 extended to FIG. 6 via a cable 167', which conductors in turn are connected to the ground conductor 128 of FIG. 7 through a plurality of relay *make* contacts FCG2–1 through FCG2–3 and FCG3–1, respectively. The latter relay contacts are controlled by relays FCG2 and FCG3, which relays are connected at one side to ground and at the other side to energizing conductors 173 and 174, respectively, which latter conductors are also extended to the previously mentioned network controller. The conductors 167 and 169 are also connected to the ground conductor 128 by means of secondary ground conductors 129 and 171, respectively, having therein relay *make* contacts FCG3–2 and FCG3–3 of the relay FCG3.

In the Service request test relay control section of FIG. 8 control is afforded relays K3, K6, K7, and K8 via conductors 175 through 178 extended to FIG. 6 via a cable 175' which conductors are each connected at one end to the respective energizing conductors 90 of the latter relays. The conductors 175 through 178 are connected at the other ends to the common ground conductor 136 of FIG. 8 through a plurality of relay *make* contacts SR2–1 through SR2–3 and SR3–1, respectively. These contacts are controlled by the relays SR2 and SR3 which relays are connected at one side to ground, respectively, and are connected at the other side to energizing conductors 181 and 182 which extend to the previously mentioned network controller. The conductors 175 and 177 are also connected to the ground conductor 136 by means of secondary ground conductors 137 and 179, respectively, having therein relay *make* contacts SR3–2 and SR3–3 of the relay SR3.

Particular ones of the K relays of FIG. 6 are also operated during the contact test and clearing operation of the control network. The relays K2 and K9 are controlled during this operation by means of a pair of conductors 183 and 184, respectively, of FIG. 8 extended to the latter relays via a cable 183', which conductors extend ground to the latter relays from the first secondary ground point of the ground conductor 140. The conductors 183 and 184 have included therein relay *make* contacts CL–2 and CL–3 controlled by the relay CL previously described. During this same test and clear operation but at a different time, the relays K1 and K9 are simultaneously operated. Control of the latter relays is had by means of a pair of conductors 185 and 186, respectively, which are extended to the latter relays via a cable 185' and which conductors extend ground to the latter relays from the second secondary ground point of the ground conductor 140. The conductors 185 and 186 have included therein relay *make* contacts CLS–2 and CLS–3 controlled by the relay CLS also previously described.

The relays K1 through K9 operate to control contacts already specified in the portions of the network and its terminal circuitry. However, these relays also operate other contacts in control conductors extending to external instruction circuits which do not comprise a part of this invention and which may now be generally considered with particular reference to FIG. 1.

External control for providing instruction and address signals for the network so far described may advantageously be provided by means of a number of circuit means devisable by one skilled in the art. Such circuit means are well known and one exemplary combination of circuits for providing the instruction and address signals required to control the various control circuits described hereinbefore is depicted in FIG. 1. Since such circuits are well known and comprise noninventive associated components external to the control network which comprises the present invention, they are shown in block symbol form only. The external circuitry is thus identified only to the extent of specifying the character of the outputs required to render the control network of this invention operable. As was mentioned earlier herein, the control network of this invention is not contemplated as being operative directly responsive to subscriber dial pulses. In order to simplify the control of the network, direct control is provided by a common control of the telephone switching system of which the present control network may be adapted for use. This common control is then operated responsive to the subscriber dial pulses. The telephone system common control 190 controls, in the exemplary system being described, a network controller 191 which operates under instructions from the common control to supply the various energizing pulses, to be more specifically identified, at the proper times. An address register 192, also under the control of instructions from the system common control 190, provides coded signals and their translation to make the necessary selection of the selection relays within the selector switches 76, 78, 80, 82, 84, 86, and 88. The network controller 191 provides control for a control path continuity check circuit 193 and also for a pulse source 194. This control is provided via a pair of conductors 195 and 196, respectively. The continuity check circuit 193 may comprise any suitable circuit readily devisable by one skilled in the art capable of detecting opens and other circuit resistance changes and this circuit is accordingly also shown in block symbol form only. The pulse source 194, similarly shown, may comprise any suitable circuit capable of providing pulses at the times and of the character to be more specifically described. The pulse source 194 is connected through a pair of relay *make* contacts K7–1 and K5–1 via a conductor 197 extended through FIGS. 2 and 3 directly to the common conductor 72 of FIG. 4. The continuity check circuit 193 is connected through a pair of relay *make* contacts K6–1 and K3–1 via a conductor 198 directly to the common conductor 66 shown in FIG. 1. The conductors 197 and 198 are connected together between their respective relay contact pairs by means of a bridging conductor 199. The latter conductor is connected through a relay *make* contact K4–1 via a conductor 200 extended through FIGS. 2 and 3 to the common conductor 74 of FIG. 4.

The network controller 191 also provides control signals for each of the network control operations. Thus, select, check and energize signals are provided for the conductors 107, 152, and 156, respectively, of the Connect order control circuits, which conductors are extended to the network controller 191 via a cable 201. Select, check and energize signals are also provided for the conductors 118, 163, and 164, respectively of the Restore control circuits, which conductors are extended to the network controller 191 via a cable 202. In the FCG test control circuits the network controller provides select, check, and energize signals for the conductors 130, 173, and 174, respectively, thereof, which conductors are extended to the network controller 191 via a cable 203. Similarly, select, check, and energize signals are provided by the network controller 191 to the conductors 138, 181, and 182 of the Service request test control circuits, which conductors are extended to the network controller 191 via a cable 204. Finally, instruction signals are provided by the network controller 191 for the Contact Test and Clear control circuit. Specifically, control signals are provided for the conductors 142 and 145 which are extended from the network controller 191 via a cable 205 and for the conductor 146 which also extends to the network controller.

In the foregoing description of an illustrative control network according to the principles of this invention, the circuits and components have been considered in sufficient detail and particularity to provide one skilled in the art with an understanding of their structural and organizational aspects. Only the polar ferreed 65 whose winding is connected in the line terminals of the control network and shown in block symbol form in FIG. 2 remains to be described in detail. This description will be provided in conjunction with illustrative network control operations in which the ferreed 65 is employed.

The advantages and novel features of the control network of this invention will further be appreciated from a consideration of illustrative operations thereof which may now be described. The first operation which will be described is the Connect order which is the final preparation of a transmission path through the parallelling transmission network for completing a subscriber connection. In order to accomplish this operation within the transmission network, line supervision is removed by opening contacts of the cut-off ferreeds, contacts of selected ferreeds in switches of the four stages are closed, and contacts of the corresponding FCG ferreed are also opened. In each of the transmission path selecting and establishing operations of the control network, the final closing of the ferreed contacts in a selected transmission path is accomplished in three steps. The series control path defining the appropriate ferreeds is selected, a continuity check of the selected control path is made, and, finally, an energizing pulse for the ferreeds is applied to the control path selected in the control network, thereby causing the contacts of the ferreed defined by the control path to close. Proceeding in the description of the Connect order operation from the left hand side of the network of FIGS. 1 through 8, the operation of the selection circuits will now be considered. It may be remarked preliminarily at this point that transmission paths may already exist in the transmission network as a result of previous selection operations. Contacts of particular ferreeds may thus already be in an operated condition in each of the stages of the network. In accordance with the destructive mark character of the present network, any energizing current pulses appearing on single coordinate control conductors on which the operated ferreeds appear will cause restoration of their contacts to the open state. Accordingly, in the case of the ferreed switches in each of the stages having an operated ferreed therein, in order to avoid interference with the latter ferreeds, it is necessary to avoid the coordinate control conductors defining the operated ferreeds in each of the switches. It will thus be assumed for purposes of description that, in addition to the external circuitry of the telephone system with which the present control network is adapted for use which was generally mentioned in the foregoing, a memory is also provided for maintaining a record of the idle and busy condition of the switching paths through the transmission network. Memory circuits for recording this information are well known in the telephone switching art and since such a memory does not comprise an inventive aspect of this invention, its presence will merely be assumed as controlling the various output signals of the common control and address register.

In the Connect order operation of the control network, as mentioned previously, the L, A, B, C, and J relays of FIG. 5 are operated to select and establish the series control path through the control network. Accordingly, address signals are supplied from the address register 192 via the cable 192' and address conductors 108 through 112 to the selector switches 78, 80, 82, 84, and 86. The address signals operate to control the selector switches to prepare an energizing circuit for one relay of each of the associated relay groups. The character of the address signals will be determined by the particular selector switches employed and accordingly need not be further described. In this operation being described, it will be assumed for purposes of illustration that the line terminal $m_8$ of switch 21–4 of grid 20–64 is to be selected at one side of the network and the junctor terminal $n_4$ of switch 32–1 of grid 30–16 at the other side of the network is to be selected as determined by a subscriber service request. Further, it will be assumed that in accordance with the busy-idle transmission path information supplied by the system memory, the links selected for completing a series control path between these two end terminals are the A link of the A link pair 39 connected to the seventh horizontal control conductor, the B link 25, and the C link 41. As determined by this busy-idle transmission path information, the signal on the address conductor 108 enables the selector switch 78 to prepare an energizing circuit for the relay L56. The latter relay is selected since its contact L56–64 is connected in the line control conductor 67 connected to the line terminal $m_8$ from which a series control path is to be established through the control network. The latter relay contact is not at this time closed, only an energizing circuit for its relay being prepared.

An address signal on the address conductor 109 also prepares a path in the selector switch 80 for the A relay A7. The latter relay is selected since its contact A7–256 is connected in the selected A link mentioned in the foregoing. For similar reasons an address signal on the address conductor 110 prepares a path in the selector switch 82 for the selection relay B16, the contact B16–64 of which appears in the B link 25 assumed to have an idle transmission path associated therewith. An address signal on the address conductor 111 controls the selector switch 84 to prepare an energizing circuit for its relay C64, the contact C64–9 of which appears in the selected C link 41 connected to the last stage switch having thereon the junctor terminal $n_4$ selected for purposes of illustration. In order to operate the required J relay, a signal on the address conductor 112 prepares an energizing circuit through the selector switch 86 for the relay J4, the contact J4–16 of which is connected in the junctor control conductor 70 connected to the selected junctor terminal $n_4$ of the last-stage switch 32–1 of the grid 30–16. The signals on the address conductors are maintained until after the selection relays are energized.

In the foregoing only energizing circuits for the selection relays have been prepared. The actual energization of the latter relays is accomplished by the Connect order circuitry depicted in FIG. 5. After the energizing circuits have been prepared, a Select signal is applied via the cable 201 and conductor 107 from the network controller 191 to complete an energizing circuit for the relay CO1. As a result, the latter relay is operated and pulls up its *make* contacts CO1–1 through CO1–5 thereby completing a circuit to ground via the common ground conductor 105 for each of the selection conductors 100 through 104, respectively. The ground circuit is extended via the common conductors 93 through 97, respectively, to operate the selected L, A, B, C, and J relays, the selection of which was described in the foregoing. The select current applied to the conductor 107 from the network controller 191 is depicted in idealized waveshape 210 in FIG. 11 and, as there shown, is applied at a time $t_0$. The select current pulse 210 is maintained for a time duration to time $t_3$ to permit the other two steps of the selection and path establishing operation. With the operation of the selection relays L56, A7, B16, C64, and J4, the respective contacts L56–64, A7–256, B16–64, C64–9, and J4–16 are closed to establish the desired series control path through the control network and its terminal circuits. This control path may be traced through the control network and its terminal circuits as follows: at the line side of the network, line control conductor 67 including the relay contacts L56–64, a fuse *fl*, the single winding of a polar ferreed 65, line terminal $m_8$ of the first-stage switch 21–4 of the grid 20–64, eighth vertical control conductor of the latter switch 21–4 and thereby corresponding ones of the control winding sets of the ferreeds occurring on this vertical, common conducting bus 23 of the latter switch 21–4, seventh horizontal control conductor of the latter switch and thereby corresponding ones of the control winding sets of the ferreeds occurring on the latter control conductor, and the operated *make* contact A7–256.

The series control path through the control network is continued via the first A link of the A link pair 39, a fuse *fa*, seventh horizontal control conductor of the switch 22–4 of the grid 20–64 and thereby corresponding ones of the control winding sets of the ferreeds occurring on this horizontal control conductor, common conducting bus 23 of the latter switch 22–4, fourth vertical control conductor of the latter switch and thereby corresponding ones of the control winding sets of the forreeds occurring on the latter control conductor, and the terminal $n_4$ of the latter switch 22–4. Tracing of the series control path through the control network is continued with the B link 25, operated *make* contact B16–64, fuse *fb*, terminal $m_8$ of the switch 31–8 of the grid 30–16, eighth vertical control conductor of the latter switch and thereby corresponding ones of the control winding sets of the ferreeds occurring on the latter control conductor, common conducting bus 23 of the latter switch 31–8, the first horizontal control conductor of the latter switch and thereby corresponding ones of the control winding sets of the ferreeds occurring on the latter control conductor, operated *make* contact C64–9, C link 41, fuse *fc*, the last horizontal control conductor of the switch 32–1 of the grid 30–16 and thereby corresponding ones of the control winding sets occurring on the latter control conductor, common conducting bus 23 of the latter switch, fourth vertical control conductor of the latter switch and thereby corresponding ones of the control winding sets of the ferreeds occurring on the latter control conductor, and the terminal $n_4$ of the switch 32–1 of the grid 30–16. The selected series control path is continued from the junctor side of the control network from the above-mentioned terminal $n_4$ via the junctor control conductor 70 connected thereto, one of the control winding sets of a ferreed 73, operated *make* contact J4–16, and a fuse *fj*.

Before tracing the remainder of the complete ferreed energizing control path circuit, the control network portions of which were traced in the foregoing, it may be noted at this point that, in addition to the contacts of the operated control path selection relays which were closed and which were specifically identified in the foregoing, each of the other contacts on these relays will also be closed. Thus, the relay L56 also has a contact in a line control conductor 67 of each of the remaining A link grids 20–1 through 20–63, the relay A7 also has a contact in every other horizontal control conductor A link of each of the last switches 21–4 of the grids 20–1 through 20–64; the relay B16 also has a contact in eight of the B links connected to each of the even numbered grids 30–2 through 30–16. The relay C64 also has operated contacts in the C links connected to the horizontal control conductors of the last switches 31–8 of the last two C link grids 30–15 and 30–16, and the relay J4 has operated contacts in the junctor control conductors 70 connected to terminals $n_4$ of each first switch 32–1 of each of the grids 30–16. Obviously, partial control paths through the control network will be established by combinations of the other operated contacts of the relays above mentioned. However, the distribution of the relay contacts for each of the selection relay groups is determined with such partial control paths in mind. This distribution accordingly is such that no other complete control paths through the control network other than the single selected one are established by the other operated relay contacts. As a result of the selection relay contact distribution an important advantage of a control network according to this invention is realized. Since no other than the desired control path is established through the control network during a control path selection operation, disjunctivity between the possible control paths is obtained without the use of unilateral conducting elements, the open relay contacts in at least one stage serving to isolate the desired control path and thereby preclude sneak current control paths.

So far only the control path through the control network itself and its terminal circuitry has been described. There remains to consider the access to both ends of the control network for energizing circuits to complete the two remaining steps in a Connect order operation, that is, the continuity check and the actual application of the ferreed energizing current pulse. The control network control paths, an illustrative one of which has been described, are terminated at the ends of the control network in the common conductor 66 at the line terminal side and in the common conductor 72 at the junctor terminal side. For the continuity check step in the control path establishing operation of the control network, a check current pulse 211 depicted in FIG. 11 is applied at the time $t_1$ from the network controller 191 via the cable 201 and the conductor 152 to complete an energizing circuit to ground for the relay CO2 of the Connect order circuit of FIG. 5. As the relay CO2 is operated, its *make* contacts CO2–1 through CO2–3 are pulled up thereby completing a circuit to ground via the common ground conductor 105 for each of the conductors 147, 148, and 149, respectively. Ground is thus extended via the latter conductors and the common conductors 90 to complete energizing circuits for the relays K2, K5, and K6 of FIG. 6. The latter relays are thereby energized and their respective single *make* contacts pulled up. The latter relay contacts are connected in pulse steering circuits originating in FIG. 1. The closing of the relay contact K2–1 connects, at the line terminal side of the network, the conductor 66 to ground. The contacts K6–1 and K5–1 complete a circuit from the Continuity check circuit 193 to the control network as follows: contact K6–1, bridging conductor 199, contact K5–1, conductor 197 extended through FIGS. 1 through 4, and the common conductor 72. A complete circuit is thus prepared by the check current pulse 211 applied at the time $t_1$ from the network controller 191. A subsequent current pulse is applied to the circuit just traced and thereby to the series control path through the control network proper as previously traced to check the continuity of the series control path circuit. Any variations or abnormal resistances in this control path will be detected by the Continuity check circuit 193. The information thus gained is employed, either to signal the next step, that is, the application of the actual ferreed energizing current pulse if the selected control path is normal, or to signal the necessity of setting up an alternate control path through the control network. At the completion of the check step in the control path selection and establishing operation, the check pulse 211 is terminated thereby releasing the relays K2, K5, and K6 and restoring their relay contacts to their normally open condition.

At the time $t_2$ and still within the time duration of the selected current pulse 210 depicted in FIG. 11, the actual ferreed energizing current pulse may be applied to the control network. Before this pulse may be applied, however, a circuit is prepared from the pulse source 194 to the junctor side of the network. This preparation is accomplished also by the Connect order circuit of FIG. 5 and specifically by the completion of energizing circuits for the relays K2, K5, and K7. An energize current pulse 212 is applied via the cable 201 from the network controller 191 and the conductor 156 to ground at the relay CO3. Upon the operation of the latter relay its *make* contacts CO3–1 through CO3–3 complete connections to ground via the common ground conductor 105 for the conductors 150, 147, and 148, respectively; for the latter two conductors the ground path extends via the secondary conductors 153 and 154, respectively. Ground is thus extended via the conductors 147, 148, and 150 and the conductors 90 to complete an energizing circuit for each of the relays K2, K5, and K7. As the latter relays are operated their *make* contacts K2–1, K5–1, and K7–1, respectively, are pulled up. These contacts appear in FIG. 1, the contact K2–1 again connecting the common conductor 66 to ground, and the contacts K5–1 and K7–1 connecting the pulse source 194 to the conductor 197. A circuit is thus prepared from the latter pulse source 194 via the conductor 197, which is extended through FIGS. 2 and 3 to FIGS. 4, to the common conductor 72 at the junctor side of the control network. Slightly subsequent to the energize current pulse 212 being applied to the conductor 156 to operate the foregoing K relays, an energizing current pulse is applied to the conductor 197 from the pulse source 194 under instructions from the network controller 191. The ferreed energizing current pulse is then carried via the conductor 72, junctor control conductor 70 connected to the selected junctor terminal, and thereby to the series control path previously traced. The energizing current pulse continues through the control network to the selected line terminal and thence along a line control conductor 67 and the common conductor 66 to ground via the operated *make* relay contact K2–1. As will be described in more detail hereinafter the conduction of the pulse through the single winding of the polar ferreed 65 also appearing in the latter control path will leave the latter ferreed released due to its polarity.

During its traversal of the series control path through the control network, the ferreed energizing current pulse is applied to both of the previously described vertical and horizontal control conductors of each of the selected switches of the four stages. At each of these switches, the current pulse is applied only to one of the control winding sets of the ferreeds occurring on the coordinates of the switches except the ferreeds defined by the intersecting coordinate control conductors. At these crosspoints the ferreeds occurring thereat are operated in accordance with the mode of operation described in connection with the differential excitation ferreed depicted in FIG. 10. The location of these ferreeds in each of the selected switches of the four stages are indicated in FIGS. 2 and 3 by an "X" within the circle. In accordance with destructive mark operation, all of the other ferreeds occurring on the coordinate control conductors of the switches along which the ferreed energizing current pulse is conducted will be released and their contacts restored to their normally open condition. The operation of the ferreeds defined by the control path in switches of the four stages as considered in the foregoing causes their respective double sets of contacts to close. As a result the tip and ring transmission paths of the parallelling transmission network, not shown in detail in the drawing, will be interconnected and the subscriber calling connection established for the portion of the transmission network controlled by the illustrative switching control network being described. In the series control path established in the control network, the current pulse was conducted through only a single control winding set of the FCG ferreed 73 involved, which control winding set was included in the selected junctor control conductor 70. As a result, the differentially excited ferreed 73 was not at this time operated and its contacts remain open.

Advantageously, the ferreeds of the switching control network of this invention permit the use of waveshapes of virtually any configuration for their energization and no set limits are imposed on their character. Thus the energizing current pulse need only be of sufficient magnitude to operate the ferreeds. Absolute coincidence of time and magnitude is also advantageously achieved for the control winding sets of the ferreeds since the same pulse is applied to both winding sets via the common conducting busses 23 of the switches. Once the flux switching in the ferreeds has been completed, the energizing current pulse may be terminated. The relatively slower acting ferreed contacts may then close completely a brief interval later without regard to the energizing circuits which cause their operation. The relays CO3, K2, K5, and K7 may also be released at the termination of the pulse 212, causing their contacts to restore to their normally open condition preparatory to a second control path selection or other operation. Following the release of the latter relays, the select current pulse 210 is terminated at time $t_3$ and the address signals from the address register 192 may also be terminated with the result that each of the contacts in the line control conductor, A link, B link, C link, and junctor control conductor will restore to its normally open condition. Because of the character of the remanent magnetic structure associated with each of the operated ferreeds within the switching control network, the contacts of the operated ferreeds will remain closed until opened responsive to the energization of only one of their respective control windings.

It may be noted from the description of the operation of the control path selection relays and pulse control relays that the selection relay contacts connected within the control paths of the control network and its terminal circuitry are not required to make or break circuit continuity during the existence of an energizing current in the control paths. Longer and more reliable relay contact life is thus advantageously insured with a resultant saving in equipment and maintenance costs. The ferreed energizing control path through the control network as previously traced, it will be recalled, included the winding of a polar ferreed 65 at the line terminal side of the control network. The ferreed energizing current pulse coming from the junctor side of the control network is in a direction such as to release the polar ferreed 65. This directional character of the ferreed 65 is indicated by an arrow in the block symbol and will be considered in connection with the cut-off control operation of the control network, a description of which follows. The contacts of the cut-off polar ferreed 65 whose winding is included in the above-traced series control path through the control network are thus open as required for the Connect order operation described in the foregoing.

After a call connection has been completed in the parallelling transmission network, a Restore operation may be performed by the switching control network. Supervision may thus be restored to the calling line at the completion of the subscriber's call. For this Restore operation the contacts of the cut-off relay are closed, and the contacts of the ferreed of the first stage switch which was operated during the foregoing Connect order operation are opened. The ferreed contacts in the switches of stages 2 through 4, which contacts were also closed during the previously described Connect order operation, and the contacts of the FCG ferreeds are left unaffected, although the previously established call connection in the paralleling transmission network will thus be broken at stage 1. The Restore operation is also accomplished in three steps: a select step in which the series control path through the control network is selected, a continuity check step for testing the resistance of the selected control path, and an energize step in which the selected control path through the control network is energized to control the ferreeds defined by the selected control path. To accomplish these steps in the Restore operation, pulses, the idealized waveshapes of which are depicted in FIG. 11, are again applied as the controlling currents. In this Restore operation the shunt circuit controlled by the S relays is employed and only the first stage of the network is involved as mentioned in the foregoing. An address signal is again applied via the cable 192' from the address register 192 and then to the address conductor 119 to control the selector switch 76 in preparing an energizing circuit therethrough for a selected S relay. Since, during this illustrative Restore operation, concern is with the series control path previously established during the Connect order operation, the address signal applied to the conductor 119, as determined by the system memory and address register 192, will select the S relay controlling the contacts associated with the first stage switch of the grid 20–64 in which the illustrative terminal $m_8$ is connected. Accordingly, the relay S64 is selected, the contact SN4–4 of which is connected to the shunt conductor 68 connected to the common conducting bus 23 of the switch 21–4 of the grid 20–64. Also as determined by the system memory and the address register 192, an address signal is applied via the cable 192′ and address conductor 108 to the selector switch 78 again to select the selection relay L56 also selected during the previous Connect order operation. The contact L56–64 is connected in the line control conductor 67 which in turn is connected to the illustrative line terminal $m_8$ of the switch 21–4 of the grid 20–64. Neither of the relays S64 nor L56 is operated at this time, only energizing circuits having been prepared therefor.

The actual energization of the relays S64 and L56 is accomplished by the Restore circuits of FIG. 7. Reference may again be had to the pulse comparison chart of FIG. 11 in connection with the three step Restore operation. In the first step for selecting the series control path through the control network, a signal is applied via the cable 202 and conductor 118 from the network controller 191 to complete an energizing circuit for the relay RO1. As a result, the latter relay is operated and pulls up its make contacts RO1–1 and RO1–2 thereby completing a circuit to ground via the common ground conductor 114 for both of the selection conductors 115 and 116, respectively, and conductors 113 and 93 to operate the S and L relays, the selection of which was described in the foregoing. The control current supplied to the conductor 118 is again the current pulse 210 depicted in FIG. 11 and is applied at the time $t_0$. The current pulse 210 is also maintained, in this operation, for a time duration to the time $t_3$ to permit the other two steps of the control path selection and establishing operation. With the operation of the selection relays S64 and L56, the respective contacts associated with these relays will all be closed. Among these operated contacts are the contacts S64–4 and L56–64, respectively, connected respectively in the shunt conductor 68 of the switch 21–4 of the grid 20–64 and in the line control conductor 67 connected to the illustrative line terminal $m_8$. As a result of the closing of the latter contacts, a series control path at the line side of the control network may be traced as follows: common conductor 66, line control conductor 67 including the operated *make* contact L56–64, a fuse *fl*, the single winding of a polar ferreed 65, line terminal $m_8$ of switch 21–4 of the grid 20–64, the eighth vertical control conductor of the latter switch and thereby corresponding ones of the control winding sets of the ferreeds occurring on the latter control conductor, including a single control winding of the ferreed operated during the previous Connect order operation which ferreed is indicated by the "X" within the circle, the common conducting bus 23 of the latter switch, its connected shunt conductor 68, a fuse *fs*, operated *make* contacts S64–4, and the common conductor 69. Disjunctivity is again provided by the distribution of the control path selection relay contacts as previously mentioned. Thus, although all of the contacts of the relay S64 are operated at this time, these contacts are all associated only with the grid 20–64 and although all of the contacts of the relay L56 are also operated, these contacts are distributed among the grids so that only its 64th contact is associated with the grid 20–64, the remaining contacts of the relay L56 being associated with grids having no operated S relay associated therewith. The control path selection for the Restore operation has thus been completed. For the continuity check step, a check current pulse 211 depicted in FIG. 11 is applied at the time $t_1$ from the network controller 191 via the cable 202 and the conductor 163 to complete an energizing circuit to ground for the relay RO2 of the Restore circuit of FIG. 7. As the relay RO2 is operated, its *make* contacts RO2–1 through RO2–3 are pulled up thereby completing a circuit to ground via the common ground conductor 114 for the conductors 157 through 159, respectively. Ground is thus extended via the latter conductors, the cable 157′, and the common conductors 90 to complete energizing circuits for the relays K1, K3, and K6, respectively, of FIG. 6. The latter relays are thereby energized and their respective single *make* contacts are pulled up. The latter relay contacts are connected in pulse steering circuits originating in FIG. 1. The closing of the relay contact K1–1 connects, at the line terminal side of the network, the conductor 69 to ground. The contacts K6–1 and K3–1 complete a circuit from the continuity check circuit 193 to the control network as follows: contact K6–1 and K3–1 and the conductor 198 connected to the common conductor 66. A complete circuit is thus prepared for a subsequent current pulse applied from the network controller 191. The latter current pulse is applied to the circuit just traced and thereby to the shunt circuit control path in the control network. The continuity of the shunt circuit control path may thus be checked and any variations or abnormal resistances in this control path will be detected by the continuity check circuit 193. The information thus gained is employed, either to signal the next step, that is, the application of the cut-off ferreed energizing current pulse if the control path is normal, or to signal the abnormality in the control path and thus to provide for corrective action by the telephone system. At the completion of the check step, the check pulse 211 is terminated thereby releasing the relays K1, K3, and K6 and restoring their relay contacts to their normally open condition.

At the time $t_2$ and still within the time duration of the select current pulse 210, a ferreed energizing current pulse may be applied to the control network. Before this pulse is applied, however, a circuit is prepared from the pulse source 194 to the applicable point in the control network. This preparation is accomplished also by the Restore circuit of FIG. 7 and specifically by the completion of energizing circuits for the relays K1, K3, and K7. An energize current pulse 212 is applied via the cable 202 from the network controller 191 and the conductor 164 to ground at the relay R03. Upon the operation of the latter relay its *make* contacts R03–1 through R03–3 complete connections to ground via the common ground conductor 114 for the conductors 160, 157, and 158, respectively; for the latter two conductors the ground path extends via the secondary conductors 165 and 166, respectively. Ground is thus extended via the conductors 157, 158, and 160, the cable 157′, and the conductors 90 to complete an energizing circuit for each of the relays K1, K3, and K7. As the latter relays are operated their *make* contacts K1–1, K3–1, and K7–1, respectively, are pulled up. These contacts appear in FIG. 1, the contact K1–1 again connecting the common conductor 69 to ground, the contacts K3–1 and K7–1 connecting the pulse source 194 to the conductor 198 via the bridging conductor 199. A circuit is thus prepared from the latter pulse source via the conductor 198 to the common conductor 66 at the line terminal side of the network. Slightly subsequent to the energize current pulse 212 being applied to the conductor 164 to operate the foregoing K relays, the ferreed energizing current pulse is applied to the conductors 199 and 198 from the pulse source 194 under instructions from the network controller 191. The latter current pulse is then carried via the conductor 66 and the line control conductor 67 in which the operated relay contact L56–64 is connected, a fuse *fl*, the single winding of a connected polar ferreed 65, to the line terminal $m_8$ of the switch 21–4 of the grid 20–64. At the latter point the current pulse is conducted via the eighth vertical control conductor of the latter switch and thereby through corresponding ones of the control winding sets of the ferreeds occurring on the latter vertical control conductor, the common conducting bus 23 of the latter switch 21–4, its connected shunt conductor 68, a fuse *fs*, operated *make* contact S64–4, common conductor 69, operated *make* contact K1–1, to ground.

During its traversal of the aforetraced control path circuit, the ferreed energizing current pulse is applied to a single control winding set of the ferreed operated during the previous Connect order operation indicated by an "X" within the circle in its first stage switch. In accordance with the destructive mark mode of operation, the latter ferreed is released and its contacts are opened. Incident to this release, contacts of all of the other ferreeds sharing the vertical coordinate control conductor with the released ferreed are also restored to their normally open state. Since the energizing current pulse is shunted out of the switch 21–4 of the grid 20–64 via the shunt conductor 68, no other ferreeds of the latter switch are affected. At the polar ferreed 65 connected in the shunt circuit control path previously traced, the energizing current pulse is now in the direction to cause the operation of this ferreed as indicated by the direction of the arrow in the block symbol. As a result, its contacts are closed, thereby restoring supervision to the transmission conductors of the subscriber line, the previously established transmission call connection having just been released. Since this invention is concerned only with the network switching control operations, the cut-off circuit, not comprising a part of this invention, is not shown or described.

The polar ferreed may comprise any electrical contacting means having a single winding associated therewith and operative responsive to a current of one polarity in the winding and which is restored to its normally open state responsive to a current of the opposite polarity in the winding. One such contacting means comprising a ferreed device which was found highly suitable for the purpose described, is the ferreed device described in the patent of J. A. Baldwin et al., No. 3,002,067, issued September 26, 1961. In the device there described a permanent magnet is associated with a pair of reed spring contacts with which spring contacts a remanent magnetic member having two stable states is also associated. A winding coupled to the remanent member is energized in one direction to induce a magnetization in the latter member to aid the field of the permanent magnet. As a result, the reed spring contacts are closed. With a reversal in the direction of the current, the fields of the remanent member and permanent magnet oppose and the contacts are opened. Although the polar ferreed generally described may advantageously be employed in the control network of this invention as a cut-off control element, it is to be understood that other such polar devices may also be equally adaptable for such use.

Once the polar ferreed 65 in the above-traced shunt circuit control path has been operated and the ferreed in the switch 21–4 of the grid 20–64 has been released, the ferreed energizing current pulse and the energize current pulse 212 may be terminated. The relays K1, K3, and K7 are released at the termination of the pulse 212, causing their contacts to restore to their normally open condition preparatory to a second network Connect order or other control operation. Following the release of the latter relays, the select current pulse 210 and the address signals from the address register 192 are also terminated with the result that each of the contacts in the line control conductor and shunt conductor of the shunt circuit will restore to its normally open condition. Obviously, the lack of rigorous margins for the ferreed energizing pulse as applied during the Connect operation also now applies. Similarly, the remanent characteristics of the polar cut-off ferreed 65 now maintain the contacts of the latter ferreed, which contacts were closed during the Restore operation, in the closed state until such time as a reverse current is applied thereto during subsequent network control operations.

The next operation of the control network of this invention which will be considered is the preparation for the false cross and ground test (FCG) of a transmission connection through the transmission network. This test is normally made immediately before completing the transmission path to a calling subscriber, that is, before the ferreed energizing pulse is applied to the control network, and accordingly the FCG test preparation is not presently described with respect to the foregoing network control operations in the sequence in which it would normally occur in the various network control operations. However, in view of the detailed description of a series control path through the control network already provided, the FCG test preparation will be more readily understood at this point. The purpose of the FCG test is to examine the integrity of the interstage transmission conductors of the selected transmission path before it is actually connected to the calling subscriber station. Accordingly, in order to avoid the circuit condition presented by the off-hook state of the subscriber line, which state would prevent obtaining a true indication of the condition of the selected transmission path, the selected transmission path is opened at the first stage switch. Accordingly, in performing the FCG test preparation, selected ones of the S, A, B, C, J, and N relays are operated during the operation, which also includes a select, a check, and an energize step. In this operation, as will become clear hereinafter, an FCG ferreed 71 is also operated.

The FCG test circuit is depicted in FIG. 7 and provides, in its first step, for the selection of one of each of the above listed relays associated with their selector switches. An address signal is again applied from the address register 192 via the cable 192′ to each of the address conductors 119, 109 through 112, and 120 connected to and controlling the respective selector switches 76, 80, 82, 84, 86, and 88. The address signals so applied prepare, in the respective selector switches, energizing paths for the selected relays of the selection relay groups associated therewith. In the illustrative FCG test preparation being described, it will be assumed that the transmission path to be tested is the one controlled by the series control path assumed for purposes of illustration in the description of the Connect order operation of the control network hereinbefore. In this operation, however, the relay S64 of the shunt conductor 68, replaces the L relay operated in the previous operation. The relay A7 of the A links, the relay B16 of the B links, the relay C64 of the C links, and the relay J4 of the junctor control conductors, all previously selected during the Connect order operation will again be operated. In addition, since an FCG ferreed associated with the selected grid 30–16 will also be operated, the no-test relay N16 will also be selected. After the energizing paths through their selector switches have been prepared for these relays, a select current pulse, which is again identical to the select current pulse 210 applied during previously described operations, is applied from the network controller 191 via the cable 203 to the conductor 130 at the time $t_0$. This select current pulse 210, shown in FIG. 11, is completed to ground at the relay FCG1 of the FCG test circuit of FIG. 7. As a result, the contacts FCG1–1 through FCG1–6 are pulled up thereby completing circuits to ground via the common ground conductor 128 for each of the respective selection conductors 122 through 127. This ground is then extended via the conductors 113, 94 through 97, and 121 to the selected relays S64, A7, B16, C64, J4, and N16. The operation and the resulting closing of the respective relay contacts complete a series control path through the control network and its terminal circuitry which may be traced as follows starting at the line side of the network: the common conductor 69, operated *make* contact S64–4, a fuse *fs*, shunt conductor 68, common conducting bus 23 of the switch 21–4 of the grid 20–64, the seventh horizontal control conductor of the latter switch and thereby corresponding ones of the control winding sets of the ferreeds occurring on the latter control conductor, operated *make* contact A7–256, the first A link of the A link pair 39, the seventh horizontal control conductor of the switch 22–4 of the grid 20–64 and thereby corresponding ones of the control winding sets of the ferreeds occurring on the latter control conductor, common conducting bus 23 of the latter switch, fourth vertical control conductor of the latter switch and thereby corresponding ones of the ferreeds occurring on the latter control conductor, and thus to the terminal $n_4$ of the latter switch 22–4.

The series control path through the control network is continued from the last-mentioned terminal $n_4$ via a B link 25, operated *make* contact B16–64, a fuse *fb*, terminal $m_8$ of the switch 31–8 of the grid 30–16, the eighth vertical control conductor of the latter switch and thereby corresponding ones of the control winding sets of the ferreeds occurring in the latter control conductor, common conducting bus 23 of the latter switch, the first horizontal control conductor of the latter switch and thereby corresponding ones of the control winding sets of the ferreeds occurring on the latter control conductor, operated *make* contact C64–9, C link 41, a fuse *fc*, the eighth horizontal control conductor of the switch 32–1 of the grid 30–16 and thereby corresponding ones of the control winding sets of the ferreeds occurring on the latter control conductor, the common conducting bus 23 of the latter switch, the fourth vertical control conductor of the latter switch and thereby corresponding ones of the control winding sets of the ferreeds occurring on the latter control conductor, and thus to the terminal $n_4$ of the latter switch 32–1. From the latter terminal $n_4$ the control path is continued via the junctor control conductor 70 connected to the latter terminal, one of the control winding sets of the FCG ferreed 71 connected in this junctor control conductor 70, operated *make* contact J4–16, a fuse *fj*, common conductor 72, to one end of the conductor 73 associated with the grid 30–16 and thereby through the other control winding set of the previously mentioned FCG ferreed 71 and through corresponding ones of the control winding sets occurring on the latter conductor, to the other end of the latter conductor 73, operated *make* contact N16–1, a fuse *fn*, and thus to the common conductor 74.

It will be apparent from the foregoing tracing of the series control path through the control network for the FCG test preparation, that the control path is identical, with exceptions at both ends of the control network, with the control path traced for the Connect order operation. This obviously is not accidental, since in actual practice the present FCG test preparation would precede the Connect order operation. In actual practice, the latter operation could be completed simply by completing the series control path through the selected first stage switch to the line control conductors 67. Upon the completion of the select step of the FCG test preparation, a check pulse 211 is applied from the network controller 191 via the cable 203 and the conductor 173 to ground at the relay FCG2. As a result, the latter relay is operated, pulling up its relay contacts FCG2–1 through FCG2–3 thereby connecting to ground, via the common ground conductor 128, the conductors 167 through 169, respectively. Ground is thereby extended via the cable 167′ to the energizing conductors 90 of the relays K1, K4, and K6 of FIG. 6. The latter relays are operative in the check step of the operation being described and their contacts appear in FIG. 1. Upon the completion of the energizing circuits for the relays K1, K4, and K6, which appear in FIG. 1, the respective *make* contacts K1–1, K4–1, and K6–1 are closed. The closing of the contact K1–1 connects the common conductor 69 to ground at the line side of the network. The contacts K4–1 and K6–1 complete a circuit from the continuity check circuit 193 to the control network as follows: operated *make* contact K6–1, a portion of the bridging conductor 199, operated *make* contact K4–1, and the conductor 200 which is extended through FIGS. 2 and 3 to FIG. 4, which latter conductor connects directly to the common conductor 74 at the junctor side of the network. A complete circuit is thus prepared for a subsequent current pulse applied from the continuity check circuit 193. The latter current pulse is applied to the control path traced in the foregoing through the control network for the FCG test preparation. The continuity of the FCG test series control path may thus be checked and any variations or abnormal resistances in this control path will be detected by the continuity check circuit 193. Should abnormalities be detected, corrective action may be taken by the telephone system. If the control path circuit is normal, the energize step of the FCG test preparation may be initiated. The check pulse 211 is terminated thereby releasing the relays K1, K4, and K6 and restoring their contacts to their normally open condition.

At the time $t_2$ and still within the duration of the select current pulse 210, a ferreed energizing current pulse may be applied to the control network. Before this pulse is applied, however, a circuit is prepared from the pulse source 194 to the applicable point in the control network. This preparation is also accomplished by the FCG test circuit of FIG. 7, and specifically by the completion of energizing circuits for the relays K1, K4, and K7. An energize current pulse 212 is applied via the cable 203 from the network controller 191 and the conductor 174 to ground at the relay FCG3. Upon the operation of the latter relay its *make* contacts FCG3–1 through FCG3–3 complete connections to ground via the common ground conductor 128 for the conductors 170, 167, and 168, respectively; for the latter two conductors the ground path extends via the secondary conductors 129 and 171, respectively. Ground is thus extended via the conductors 167, 168, and 170, the cable 167′, and the energizing conductors 90 to complete an energizing circuit for each of the relays K1, K4, and K7. As the latter relays are operated their *make* contacts K1–1, K4–1, and K7–1, respectively, are pulled up. These contacts appear in FIG. 1, the contact K1–1 again connecting the common conductor 69 to ground, the contacts K4–1 and K7–1 connecting the pulse source 194 to the conductor 200 via the bridging conductor 199. A circuit is thus prepared from the latter pulse source via the conductor 200 extended through FIGS. 2 and 3 to the common conductor 74 at the junctor terminal side of the network. Slightly subsequent to the energize current pulse 212 being applied to the conductor 174 to operate the foregoing relays, the ferreed energizing current pulse is applied to the conductors 199 and 200 from the pulse source 194 under instructions from the network controller 191. The ferreed energizing current pulse is then carried via the conductor 74 to the series control path previously described for the FCG test preparation.

During its traversal of the series control path thus existing in the control network, the ferreed energizing current pulse is applied to both control winding sets of the selected FCG ferreed 71 thereby causing its contacts to close. Similarly, the ferreeds at the crosspoints of the energized coordinate control conductors in the selected switches of the second, third, and fourth stages are also operated and their contacts closed. These are the same ferreeds operated as described in the Connect order operation previously herein and are indicated by an "X" in the encircled crosspoint. In the first stage switch only one of the control winding sets of the crosspoint ferreed ultimately to be operated during the subsequent Connect order operation is energized. Accordingly, the contacts of the latter ferreed are opened if previously closed. The ferreed energizing current pulse also by-passes the winding of polar cut-off ferreed 65 of the control path subsequently to be energized during the Connect order operation and accordingly the latter ferreed is left undisturbed from its previous condition.

Once the FCG ferreed has been operated and the ferreeds in the other stages of the network have been operated, the energize current pulse 212 may be terminated. The relays K1, K4, and K7 are thus released, causing their contacts to restore to their normally open condition. The remanent character of the structure associated with each of the latter ferreeds maintains their contacts in the closed condition without the application of further energizing current. Following the release of the relays K1, K4, and K7, the select current pulse 210 is terminated at the time $t_3$ and the address signals from the address register 192 are also terminated with the result that each of the contacts in the control network links and terminal circuitry previously described will be restored to their normally open condition. The operated condition of the selected FCG ferreed and the ferreeds in the second, third, and fourth stages of the control network will permit the completion through their respective contacts of the FCG test on the paralleling transmission network connection.

The flexibility of a switching control network according to the principles of this invention may be further demonstrated with the description of another of its possible transmission network control operations. This operation is a Simulated service request and permits the testing of a subscriber's line circuit from inside the central office without the necessity of actually visiting the premises in which the subscriber substation is located or of manually clipping test leads into the subscriber's line terminals at the central office. In a manner similar to that of the control operations already described, his Simulated service request operation is performed by setting up a series control path through particular portions of the switching control network and its terminal circuitry, checking this control path for normal resistance, and then applying an energizing pulse to the control path to operate the ferreed crosspoints defined thereby in the various stages of the network. The selection and establishing of the control path through the control network is performed, as in previously described operations, by the selection relays of FIG. 5 under the control of address information signals from the address register 192 of FIG. 1. The continuity check and energizing steps of the operations are performed again by the K relays of FIG. 6 under the control of the service request test control section depicted in FIG. 8.

More specifically, in the service request test operation, ferreeds of each of the stages are operated, a cut-off ferreed is operated, and the FCG ferreed of the conducting path to be tested is released. The shunt circuit at the line terminal side of the control network associated with the transmission path to be tested is not at this time employed and accordingly no shunt relay is operated. As mentioned previously, this operation of the control network is also accomplished in three steps: a control path selection and establishing step, a continuity check step, and a control path energizing step. In the first of these steps, an address signal is applied from the address register 192 via the cable 192' to each of the address conductors 108 through 112 connected to and controlling the respective selector switches 78, 80, 82, 84, and 86. The address signals so applied prepare, in the respective selector switches, energizing paths for the selected relays of the selection relay groups associated therewith. In the illustrative Simulated service request test being described, it will again be assumed that the transmission path to be tested is the one controlled by the series control path assumed for purposes of illustration in the previously described transmission network control operations. Accordingly, relays L56, A7, B16, C64, and J4 are again selected. After the energizing paths through their selector switches have been prepared for these relays, a select current pulse, which is again the select pulse 210 depicted in FIG. 11, is applied from the network controller 191 via the cable 204 to the conductor 138 at the time $t_0$. This select control current pulse 210 is completed to ground at the relay SR1 of the service request test circuit of FIG. 8. As a result, the contacts SR1–1 through SR1–5 are pulled up thereby completing circuits to ground via the common ground conductor 136 for each of the respective selection conductors 131 through 135. This ground is then extended via the conductors 93 through 97 to the selected relays L56, A7, B16, C64, and J4. The operation and the resulting closing of the respective relay contacts completes a series control path through the control network and is terminal circuitry which has already been considered in detail hereinbefore.

Upon the completion of this series control path through the control network the continuity check step is performed. A check pulse 211 depicted in FIG. 11 is applied from the network controller 191 via the cable 204 and the conductor 181 to ground at the relay SR2 of FIG. 8. As a result, the latter relay is operated, pulling up its relay *make* contacts SR2–1 through SR2–3 thereby connecting to ground, via the common ground conductor 136, the conductors 175 through 177, respectively. Ground is thereby extended via the cable 175' to the energizing conductors 90 of the relays K3, K6, and K8 of FIG. 6. The latter relays are operative in the check step of the operation being described and their contacts appear in FIG. 1. Upon the completion of the energizing circuits for the relays K3, K6, and K8, the respective *make* contacts K3–1, K6–1, and K8–1 are closed. The closing of the contact K8–1 connects the common conductor 72 at the junctor terminal side of the network directly to ground. The contacts K3–1 and K6–1 complete a circuit from the continuity check circuit 193 to the switching control network as follows: operated *make* contacts K6–1 and K3–1 and the conductor 198 which is connected to the common conductor 66 at the line terminal side of the network. A complete circuit is thus prepared by the check current pulse 211 which, as depicted in FIG. 11, is applied at the time $t_1$ from the network controller 191. A subsequent current pulse is applied to the common conductor 198 from the continuity check circuit 193 and thence via the common conductor 66 directly to the switching control network.

In the present illustrative operation it may be noted that the check current pulse is applied at the line terminal side of the control network. Although, in the Restore order operation already described a current pulse was applied to the shunt circuit at the line side of the control network, each of the other operations involved the application of current pulses at the junctor side of the control network with the current pulse appearing in one direction through the ferreeds of the switching stages. Advantageously, this made possible the release of the polar cut-off ferreed defined by the control path. The bidirectional current characteristic of the control path network of this invention is aptly demonstrated in the present illustrative operation where the current pulse is applied at the line terminal side and the current pulse traverses the control winding sets of the ferreeds in the opposite direction from that previously used. As will become evident, this change in polarity of the current in the control winding sets of the ferreeds in the switching stages has no ultimate affect on their operation. However, in this case the current in the control path is in the direction to operate the polar cut-off ferreed.

The continuity check current pulse is conducted through the control network from the point connecting the conductors 198 and 66 through the series control path previously traced, the selection of which was described in the foregoing. The continuity of the service request test control path may thus be checked and any variations of abnormal resistances in this circuit will be detected by the continuity check circuit 193. Any abnormalities are thus signalled for corrective action if such abnormalities exist. If the circuit is found normal, the energize step in the service request operation may be accomplished. In preparation for this final step the check current pulse 211 is terminated thereby releasing the relays K3, K6, and K8 and restoring their contacts to their normally open condition.

At the time $t_2$ and still within the duration of the select pulse 210, an energizing current pulse for the network ferreeds may be applied. A circuit is prepared for the latter pulse from the pulse source 194 to the connecting point of the conductors 198 and 66 by other relays of the K group of relays of FIG. 6. This preparation is also accomplished by the service request test control circuit of FIG. 8. The energize current pulse 212 is applied via the cable 204 from the network controller 191 and the conductor 182 to ground at the relay SR3. Upon the operation of the latter relay its *make* contacts SR3–1 through SR3–3 complete connections to ground via the common ground conductor 136 for the conductors 178, 175, and 177, respectively; for the latter two conductors the ground path extends via the secondary conductors 137 and 179, respectively. Ground is thus extended via the conductors 175, 177, and 178, the cable 175', and the energizing conductors 90 to complete an energizing circuit for each of the relays K3, K8, and K7, respectively. As the latter relays are operated the *make* contact K8–1 which appears in FIG. 4, is pulled up thereby again connecting the common conductor 72 at the junctor side of the control network directly to ground. The *make* contacts K7–1 and K3–1 appearing in FIG. 1 connect the pulse source 194 to the conductor 198 via the bridging conductor 199. A circuit is thus prepared from the latter pulse source via the conductor 198 to the common conductor 66 at the line terminal side of the control network. Slightly subsequent to the control current being applied to the conductor 182 to operate the foregoing relay contacts, a ferreed energizing current is applied to the conductors 199 and 198 from the pulse source 194 under instructions from the network controller 191. This current is then carried via the conductor 66 to the network control path previously described in connection with other illustrative operations of the control network.

During its traversal of the series control path previously established through the control network and its terminal circuitry during the select step, the ferreed energizing current is applied to the control winding of the selected polar cut-off ferreed in the direction such as to cause its operation. The energizing current is also operative in the control winding sets of the ferreeds of the switching stages to close their contacts and at the junctor side of the network the energizing current at this time traverses only a single control winding of the selected FCG ferreed thereby causing its contacts to open. The transmission network path defined by the above control path is thus in the condition prescribed for the service request simulation operation stipulated in the foregoing. This operation may then be carried out in the transmission network to test the subscriber's transmission line.

Once the cut-off ferreed and the ferreeds in the switching stages have been operated and the FCG ferreed released, the energize current pulse 212 may be terminated. The relays K3, K7, and K8 are thereby released, causing their contacts to restore to their normally open state in preparation for subsequent network operations. The remanent character of the structure associated with each of the latter ferreeds maintains their contacts in the required operative state without the application of further energizing current. Following the release of the relays K3, K7, and K8, the select current pulse 210 is terminated at the time $t_3$ and the address signals from the address register 192 are also terminated with the result that each of the contacts in the control network links and terminal circuitry previously described will be restored to its normally open condition. The closed contact state of the selected cut-off ferreed and switching stage ferreeds will permit the completion through their respective contacts of the Simulated service request test in the parallelling transmission network.

In each of the aforedescribed illustrative transmission network control operations by the switching control network of this invention, individual relays from the relay groups controlling the various stages and portions of the control network were selectively operated to establish a single exclusive series control path through the control network and its terminal circuitry. As is clear from FIGS. 5, 7, and 8, the last of the representative possible control operations which was described, that is, the Simulated service request operation, involved the last employment of the selector switches of FIG. 5. As depicted in FIG. 8, the common conductors 93 through 97 terminate in the Simulated service request control circuits. One further control operation also involving the selection relays but not the associated selector switches will be considered. This operation is the selection relay contact test and clear operation and is performed by means of the control circuitry for operating the selection relays independently of the selector switches, which control circuitry is depicted in FIG. 8.

As mentioned previously herein, the control network condition to which the present test operation is directed is the problem of possible sticking selection relay contacts. If such a selection relay contact, which controls a control path segment in a portion of the control network, is for any reason held closed, it cannot be opened merely by releasing its relay. Accordingly that one control path segment which the stuck relay contact controls may introduce spurious "sneak-back" control paths, cause false releases of ferreeds, and otherwise interfere with the operation of the network. In accordance with one feature of this invention, such stuck contacts are advantageously tested for and the including control path segment cleared in the contact test and clear operation. This operation may now be described in detail.

For purposes of illustration it will be assumed that the contact C57–16, in the C link 42 connecting the eighth horizontal control conductor of the switch 31.1 of grid 30–16 and the first horizontal control conductor of switch 32–8 of the same grid, is for some reason stuck closed. The contact test and clear operation is based on the fact that if the contacts in the control path segments between all of the stage 3 and all of the stage 4 switch terminals are opened and if a potential is applied between these two stages, the fuse also connected in the illustrative C link 42 will be caused to melt. This advantageously follows since during the test operation, if all of the other control path selection relay contacts in the various stages are presumably open, all of the potential is thus applied across the single link containing the defective relay contact. With the melting of the fuse, the interfering control path segment through the stuck contact is opened. Should this defective control path segment be subsequently selected for a transmission network control operation, the routine continuity check step will disclose its presence. The contact test and clear operation is performed while the network is in use; accordingly, a direct current is applied of a magnitude sufficiently low so as not to interfere with operated ferreeds in the switching stages but of sufficiently long duration to open the fuse filament.

The contact test and clear operation may be performed selectively or sequentially with respect to switching stages and the latter manner of operation will be assumed. The first step in the operation is to select the stage of the network which is to be tested, that is, by opening all of the selection relay contacts in this stage. This step is accomplished for each of the various control network portions by the relays CT1 through CT6 of FIG. 8. Assuming the sequential testing from the line terminal side of the network, a control current is applied from the network controller 191 via the calbe 205 and an energizing conductor 142 to ground at the relay CT1. As the latter relay is operated its *break* contact CT–1 is opened thereby opening the energizing circuit for the relay LL. A second control current is now applied from the network controller 191 via the cable 205 and the energizing conductor 145 to ground at the relay CL. The latter relay is operated thereby closing each of its *make* contacts CL–1 through CL–3. The closing of the contact CL–1 completes a path to ground via the common ground conductor 140, unoperated *break* contacts CT2–1 through CT6–1 and conductors 92 for each of the relays AA, BB, CC, JJ, NN, respectively. As described in the foregoing, the energizing circuit for the relay LL is open at this time at the operated *break* contact CT1–1. Upon the operation of the latter relays, each of the *make* contacts included in the auxiliary energizing circuits for the selection relays A1 through A8, B1 through B16, C1 through C64, J1 through J64, and N1 through N16 are operated. These relay contacts are the contacts AA–1 through AA–8, BB–1 through BB–16, CC–1 through CC–64, JJ–1 through JJ–64, and NN–1 through NN–16, respectively.

Each of the selection relays of FIG. 5 except the relays S1 through S64 and L1 through L64 are thus operated and as a result all of the selection relay contacts with the exception of the contacts in the shunt conductors and the line control conductors are closed. Each of the possible control paths in the control network is thus completed in each of its various portions except the control paths comprising the line control conductors and shunt conductors. When the relay CL was operated its contacts CL–2 and CL–3 also completed circuits to ground via the common ground conductor 140 for the conductors 183 and 184 extended through FIGS. 7 and 5 to FIG. 9 via a cable 183' where the latter two conductors extend ground to the relays K2 and K9. The operation of the relay K2 pulls up its contact K2–1, appearing in FIG. 1, which connects the common conductor 66 directly to ground. The operation of the relay K9 pulls up its contact K9–1, appearing in FIG. 4, which completes a circuit at the common conductor 74 to the source of potential 76 through the resistance 75. With the closing of the contact K9–1 a potential is applied from the source 76 through each of the possible parallel control paths of the control network across the now open line control conductors. Should the control network be normal at this stage of the test operation, that is, should none of the selection contacts in the line control conductor section be stuck closed, no action takes place in the control network. Since this is the condition assumed for the illustrative operation being described, the control circuit of FIG. 8 may now proceed to the testing of the next stage in the testing sequence, that is, the A links. The control current on the energizing conductor 145 is first terminated to open each of the energizing circuits for the relays AA, BB, CC, etc. The release of the respective contacts of the latter relays restores the selection relays A1 through A8, B1 through B16, etc. In the next step of the test operation a control current is applied from the network controller 191 via the cable 205 and an energizing conductor 142 to ground at the relay CT2. The operation of the latter relay opens its *break* contact CT2–1 thereby opening the energizing circuit for the relay AA. When the relay CL is subsequently energized, all of the selection relays of FIG. 5 will again be operated, in the manner described in the foregoing, with the exception of the selection relays A1 through A8. All of the selection relay contacts will again be closed with the exception of the contacts controlling the A links. A potential originating at the source 76 applied through the operated *make* contact K9–1 now fails to find closure for current at the open A links and, since in the illustrative operation being described no stuck contacts appear in these A links, the sequential testing may now proceed to the remaining stages of the network. When the testing arrives at the C link portion of the network, each of the relays LL, AA, BB, JJ, and NN are operated in the manner described, leaving all of the selection relay contacts of the C links open. At this point it will be recalled that the selection relay contact C57–16 was assumed for purposes of illustration to be stuck closed. Accordingly, a single control path through the C links is thus presented therethrough for current induced by the potential source 76. Under the control of the relays K2 and K9 and the network controller 191, the potential source 76 is left connected to the network for a sufficient time to melt the filament of the fuse *fc'* connected in the C link 42 also including the stuck contact C57–16. With the latter fuse blown the interfering C link is cleared and the danger of sneak control paths through the control network resulting from the stuck contact is eliminated. During a subsequent continuity check the open fuse in the C link will be detected and the associated selection contact may be repaired. As mentioned previously the current is adjusted by means of the suitably selected resistance 75 so that it is of a low enough order not to disturb operated ferreeds also appearing in the paths being tested.

The shunt circuits at the line terminal side of the network are similarly tested but in this case by its individual control circuit also appearing in FIG. 8. Since each of the other control paths through the control network in this step must be closed, each of the selection relays LL, AA, BB, etc., is operated, the relays controlling the *break* contacts in the energizing circuits for the latter relays, that is, the relays CT1 through CT6 not in this case being operated. The test circuit for the testing potential is again prepared by particular ones of the K relays under the control of a current applied from the network controller 191 via the conductor 146 to ground at the relay CLS. Upon the operation of the latter relay its *make* contact CLS–1 is pulled up to connect each of the relays LL, AA, etc., to ground. The *make* contacts CLS–2 through CLS–3 are also pulled up thereby connecting the conductors 185 and 186 to ground at the common ground conductor 140. This ground is extended via the cable 185', extending through FIGS. 7 and 5 to FIG. 6, and energizing conductors 90 to operate the relays K1 and K9. As a result, the *make* contact K1–1 appearing in FIG. 1 is closed, thereby connecting the common conductor 69 directly to ground at the line terminal side of the network. This *make* contact K9–1 is also operated which connects, as in previous contact test steps, the potential source 76 to the common conductor 74 through the resistance 75. The testing potential is thus applied through the successive stages of the control network across the shunt conductors. Here again, should a stuck contact exist in any of the shunt conductors the fuse *fs* associated in the control path with the stuck contact will be blown, thereby clearing the network of the control path thus spuriously established therein. When the test operation has been completed the relay CLS is released thereby also releasing the relays K1 and K9 to open the test circuit from the potential source 76.

The contact test and clear operation may be made periodically while the control network is in use in controlling the establishment of subscriber line connections. The fuses selected for use in the test operation just described are chosen to operate within the current margins imposed by the number of parallel control paths established during the operation. The most rigorous current margins for the illustrative network described may be seen to be of the order of 4:1, established by the required current division among four B links when a single A link connected to the corresponding second stage switch is defective. Fuses of the character operative between these margins may readily be provided to insure positive contact testing.

In the foregoing description the polarity of various current pulses and potentials have been mentioned and these are also indicated in the drawing. Obviously, these polarities are illustrative only. In the practice of this invention, it is obvious that the polarities of the operating current pulses and potentials will be determined by the winding senses of the various switches in conjunction with the available outputs of the telephone system with which this invention may be adapted for use.

What have been described are considered to be only illustrative embodiments and modes of operation of this invention. Accordingly, it is to be understood that various and numerous other networks and modes of operation may be devised by one skilled in the art without departing from the spirit and scope of this invention.

What is claimed is:

1. A telephone switching network having a plurality of stages comprising a plurality of coordinate switch arrays in each of said stages; each of said switch arrays comprising a first plurality of coordinate control circuits, a second plurality of coordinate control circuits intersecting said first plurality of coordinate control circuits to define the coordinates of said switch array, electrical contacting means at said coordinates operable responsive to coincident energization of the coordinate control circuits defining said coordinates for establishing transmission paths through said switch array, and a common conducting means interconnecting one end of each of said coordinate control circuits of said first and second plurality of coordinate control circuits; a plurality of groups of interstage control links for interconnecting said coordinate control circuits of the switch arrays of adjacent stages; a first and second plurality of terminal control circuits connected respectively to the other ends of the coordinate control circuits of the switch arrays of the first and last stage of said plurality of stages; a plurality of groups of relay contacts connected respectively in said interstage control link groups and said first and second plurality of terminal control circuits; and a plurality of groups of relay means selectively energizable in each relay means groups for operating predetermined relay contacts in each of said relay contact groups to determine continuous control paths through said network.

2. A telephone switching network according to claim 1 in which the switch arrays of adjacent pairs of stages are arranged in switch array groups, interstage control links of certain of said control link groups connecting each switch array of one stage within a switch array group with each switch array of an adjacent stage within the same switch array group and interstage control links of others of said control link groups connecting each switch array group of one pair of stages with each switch array group of an adjacent pair of stages.

3. A telephone switching network according to claim 2 in which the switch arrays of the first and second stage comprise concentrator switch arrays, said concentrator switch arrays each having more of said coordinate control circuits in said first plurality than in said second plurality.

4. A telephone switching network according to claim 3 in which the electrical contacting means of each of said first stage switch arrays are arranged at predetermined coordinates such that particular groups of said first plurality of coordinate control circuits of a first stage switch array cooperate with only particular and different groups of said second plurality of coordinate control circuits of the same switch array to define said predetermined coordinates.

5. A telephone switching network according to claim 1 in which each of said electrical contacting means comprises a ferreed having two control winding means, said two control winding means being serially connected respectively in the coordinate control circuits defining said ferreed, said ferreed being operated responsive to the coincident energization of both of said control winding means and said ferreed being restored responsive to the energization of only one of said control winding means.

6. A telephone switching network according to claim 1 also comprising a fuse connected in each of said interstage control links and in each of said first and second plurality of terminal control circuits, means for controlling said plurality of groups of relay means to close simultaneously all of the relay contacts of all of said groups of relay contacts except those of one group, and means for simultaneously applying a potential to each of said second plurality of terminal control circuits.

7. A telephone switching network comprising a plurality of stages of switch arrays; each array comprising a plurality of electromagnetically controlled relay means operated responsive to the energization of a first and a second winding means associated therewith, first and second coordinate control conductors serially including respectively said first and second winding means, each said relay means including connecting means for establishing a transmission connection through said array when said relay means is operated, and means for interconnecting the output and input ends of said first and second coordinate control conductors respectively; a plurality of control links for connecting the output ends of said second coordinate control conductors of the switch arrays of each of said stages with the input ends of said first coordinate control conductors of the switch arrays of the succeeding stage; a plurality of selection relay contacts connected respectively in said plurality of control links; a plurality of selection relay means for controlling combinations of said selection relay contacts; first selection means for selectively applying an energizing current pulse to the input end of a first coordinate control conductor of an end stage of said network; and second selection means for selectively completing a circuit for said current pulse at the output end of a second coordinate control conductor of another end stage of said network.

8. A telephone switching network according to claim 7 in which said first and second selection means each comprises a plurality of terminal control conductors each having a relay contact connected therein and a plurality of terminal selection relay means for controlling said last-mentioned relay contacts.

9. A telephone switching network according to claim 8 in which each of said electromagnetically controlled relay means comprises a differentially operated ferreed device.

10. A multistage telephone switching network having in each of its stages a plurality of arrays of crosspoint devices, each of said arrays having input and output sets of coordinate control conductors; and comprising conducting means for each of said arrays connecting the input and output sets of coordinate control conductors of said array; a plurality of interstage control links interconnecting said output set of coordinate control conductors of each of the arrays of one stage with the input set of coordinate control conductors of each of the arrays of a succeeding stage; a plurality of relay contacts connected respectively in said interstage control links; and a plurality of relay means for controlling respectively said plurality of relay contacts such that a continuous and unique series control path is established between any coordinate control conductor of said input set of an array of the first stage of said plurality of stages and any coordinate control conductor of said output set of an array of the last stage of said plurality of stages.

11. A multistage telephone switching network having in each of its stages a plurality of arrays of crosspoint devices, each of said arrays having first and second coordinate control conductors; and comprising a conducting means for each of said arrays for connecting all of said first coordinate control conductors of an array with all of said second coordinate control conductors of the same array, a plurality of interstage control links each having a relay contact therein for connecting coordinate control conductors of each of said arrays of one stage to coordinate control conductors of any array of the succeeding stage, a plurality of relay means for selectively controlling said relay contacts, and terminal selection means for simultaneously applying different potentials to selected first and second coordinate control conductors of the arrays of only the first and last stages of said network, respectively.

12. A multistage telephone switching network according to claim 11 in which said terminal selection means comprises a plurality of line control conductors each having a relay contact therein connected to one potential source, a plurality of relay means for selectively controlling said last-mentioned relay contacts, a plurality of junctor control conductors each having a relay contact therein connected to another potential source, and a plurality of relay means for selectively controlling said last-mentioned relay contacts.

13. An electrical switching system comprising a first and a second sequence of grid networks; each of said grid networks comprising a first and a second sequence of switches; each of said switches comprising a coordinate array of ferreed devices at the crosspoints of said coordinate array, first and second coordinate control conductors defining said crosspoints and responsive to coincident energization thereof for operating said ferreed devices defined thereby, each of said ferreed devices including means for establishing a transmission connection through said switch when said ferreed device is operated, and a conducting means for connecting one end of each of said first coordinate control conductors with one end of each of said second coordinate control conductors; each of said grid networks further comprising a plurality of interswitch control links each including a relay contact for interconnecting the other ends of the second coordinate control conductors of said first sequence of switches and the other ends of said first coordinate control conductors of said second sequence of switches; said first coordinate control conductors of said first sequence of switches defining inputs for said grid networks and said second coordinate control conductors of said second sequence of switches defining outputs for said grid networks; a plurality of relay means for selectively controlling respectively said relay contacts in said interswitch control links for establishing a unique conducting control path through a grid network; a plurality of intergrid control links each including a relay contact for interconnecting the output defining coordinate control conductors of said first sequence of grid networks and the input defining coordinate control conductors of said second sequence of grid networks, and another plurality of relay means for selectively controlling respectively said last-mentioned relay contacts in said intergrid control links for establishing a unique conducting control path between said first and second sequences of grid networks.

14. An electrical switching system according to claim 13 in which said interconnection of said interswitch control links is such that the second coordinate control conductors of a particular switch of said first sequence of switches are connected respectively to the first coordinate control conductor of each of the switches of said second sequence of switches corresponding to the numerical position of said particular switch in said first sequence of switches.

15. An electrical switching system according to claim 14 in which the interconnection of said intergrid control links is such that one of the output defining coordinate control conductors of a particular grid network of said first sequence of grid networks is connected to an input defining coordinate control conductor of each of the grid networks of said second sequence of grid networks.

16. An electrical switching network comprising a plurality of stages each comprising an array of electrical contacting means arranged in rows and columns, each of said contacting means having a first and second winding means associated therewith and operable responsive to energization of said first and second winding means to complete a transmission connection; each said array comprising a plurality of row control circuit means for connecting the first winding means associated with the contacting means of each of said rows in series, a plurality of column control circuit means for connecting the second winding means associated with the contacting means of each of said columns in series, and a common conducting bus connecting one end of each of said plurality of row control circuit means to one end of each of said plurality of column control circuit means; a plurality of control paths each serially including a row and column control circuit means of each of said stages and one of a plurality of interstage control links each having a relay contact therein; a plurality of relay means for selectively controlling respectively said relay contacts for connecting the other end of a particular row control circuit means of each of said stages to the other end of a particular row control circuit means of the next succeeding stage; first control terminal selection means for selectively applying first potentials to the column control circuit means of the first stage of said plurality of stages; and second control terminal selection means for selectively applying second potentials to the column control circuit means of the last stage of said plurality of stages simultaneously with said first potentials.

17. A telephone switching network comprising a plurality of stages of coordinate switch arrays; each array comprsing a plurality of transmission path selection electrical contacting means arranged at the coordinates thereof, said contacting means selectively operated responsive to the energization of a first and a second winding means associated therewith to establish a selected transmission connection, first and second coordinate control conductors serially including respectively said first and second winding means, and a common conducting means for connecting one of the ends of each of said first coordinate control conductors to one of the ends of each of said second coordinate control conductors; a plurality of groups of control links for interconnecting the other ends of said second coordinate control conductors of the switch arrays of each of said stages with the other ends of said first coordinate control conductors of the switch arrays of the succeeding stage; a plurality of groups of control link selection relay contacts connected respectively in said plurality of groups of control links; a plurality of control link selection relay means for selectively controlling combinations of said control link selection relay contacts for establishing a selected series conducting control path through said plurality of switch arrays; a plurality of line control conductors connected respectively to the other ends of the first coordinate control conductors of a first end stage of said network; a plurality of line selection relay contacts connected respectively in said plurality of line control conductors; a plurality of line selection relay means for selectively controlling said line selection relay contacts; a plurality of junctor control conductors connected respectively to the other ends of the first coordinate control conductors of the other end stage of said network; a plurality of junctor selection relay contacts connected respectively in said plurality of junctor control conductors; and a plurality of junctor selection relay means for selectively controlling said junctor selection relay contacts.

18. A telephone switching network according to claim 17 also comprising a cut-off electrical contacting means having a single winding means connected in each of said line control conductors, said cut-off electrical contacting means being operative responsive to current in one direction in said single winding means for establishing a transmission connection and being restored to its released state responsive to current in the opposite direction in said single winding means for opening said transmission connection.

19. A telephone switching network according to claim 17 also comprising a plurality of test electrical contacting means each having a first and a second winding means associated therewith, one of said last-mentioned first and second winding means of each of said test electrical contacting means being connected in a respective junctor control conductor, said plurality of test electrical contacting means being arranged in groups, a plurality of test control conductors for connecting the other of said last-mentioned first and second winding means of said test electrical contacting means of each of said groups in series, a plurality of test selection relay contacts connected respectively in said plurality of test control conductors, and a plurality of test selection relay means for selectively controlling said test relay contacts, each of said test electrical contacting means responsive to coincident energization of said responsive junctor control conductor and one of said test control conductors for establishing a test transmission connection.

20. A telephone switching network according to claim 19 also comprising a plurality of shunt conductors connected respectively to said common conducting means of the switch arrays of said first end stage of said network, a plurality of shunt selection relay contacts connected respectively in said plurality of shunt conductors, and a plurality of shunt selection relay means for selectively controlling said shunt relay contacts.

21. A telephone switching network according to claim 20 in which each of said control links of said plurality of groups of control links, each of said line control conductors of said plurality of line control conductors, each of said junctor control conductors of said plurality of junctor control conductors, each of said test control conductors of said plurality of test control conductors, and each of said shunt conductors of said plurality of shunt conductors has a fuse connected therein.

22. A telephone switching network according to claim 19 in which each of said plurality of selection electrical contacting means and each of said plurality of test electrical contacting means comprises a ferreed device operative from its operated state to its released state responsive to the exclusive energization of only one of its first and second winding means.

23. A telephone switching network according to claim 22 also comprising means for selectively controlling said link selection relay means, said line selection relay means, said junctor selection relay means, and said test selection relay means to close all of the relay contacts in one of said plurality of groups of control links, said plurality of line control conductors, said plurality of junctor control conductors, and said plurality of test control conductors, respectively, except in a selected one group of said last-mentioned groups of control links and control conductors; and means including a source of potential for selectively completing circuits between the ends of each of said junctor control conductors and said test control conductors and the ends of each of said line control conductors and said shunt conductors.

24. A multistage electrical switching system comprising a first and a second sequence of grid networks; each of said grid networks comprising a first and a second stage of switches thereby presenting four stages of switches in said system; each of said switches comprising a coordinate array of ferreed devices, first and second coordinate control conductors for operating said ferreed devices at the coordinates of said coordinate array when the first and second coordinate control conductors defining the coordinate locations of said ferreed devices are coincidentally energized, each said ferreed device including means for establishing a transmission connection through said switch when said ferreed device is operated, and a common conducting means for connecting each of said first coordinate control conductors with each of said second coordinate control conductors; a first plurality of interstage control links each including a relay contact for interconnecting coordinate control conductors of the switches of the first and second stages of said four stages; a second plurality of interstage control links each including a relay contact for interconnecting coordinate control conductors of the switches of the second and third stages of said four stages; a third plurality of interstage control links each including a relay contact for interconnecting coordinate control conductors of the switches of the third and fourth stages of said four stages; a plurality of line control conductors each including a relay contact connected to coordinate control conductors of the switches of said first stage; a plurality of junctor control conductors each including a relay contact connected to coordinate control conductors of the switches of said fourth stage; and a plurality of groups of selection relay means for selectively controlling respectively said pluralities of relay contacts to establish exclusive series control paths in said system between said junctor control conductors and said line control conductors.

25. A multistage electrical switching system according to claim 24 also comprising means for testing said exclusive series control paths comprising means including continuity test means for completing a test circuit from the end of each of said plurality of junctor control conductors and the end of each of said plurality of line control conductors.

26. A multistage electrical switching system according to claim 24 also comprising means including a pulse source for completing a control circuit from the end of each of said plurality of junctor control conductors and the end of each of said plurality of line control conductors.

27. A multistage electrical switching system according to claim 24 in which said ferreed devices each have a first and a second winding means associated therewith, said ferreed devices being operated responsive to a current in both of said first and second winding means for establishing said transmission connection and being released responsive to a current in one of said first and second winding means exclusively for opening said transmission connection.

28. A multistage electrical switching system according to claim 27 also comprising a plurality of cut-off switches associated respectively with said plurality of line control conductors, each of said cut-off switches having a single winding coupled thereto and connected in its associated respective line conductor and being operative responsive to a current in one direction in said single winding for establishing a transmission connection and being released responsive to a current in the opposite direction in said single winding for opening said transmission connection.

29. A multistage electrical switching system according to claim 28 also comprising means for simultaneously operating said cut-off switches and releasing operated ferreed devices in said first stage comprising a plurality of shunt conductors each including a relay contact and connected respectively to said common conducting means of said switches of said first stage, a group of shunt relay means for selectively controlling respectively said relay contacts in said plurality of shunt conductors, and means including said pulse source for completing a shunt control path circuit from the end of each of said plurality of line control conductors and the end of each of said plurality of shunt conductors such that the output current of said pulse source is in said one direction to operate said cut-off switches associated with said line control conductors.

30. A multistage electrical switching system according to claim 29 also comprising means for testing said shunt control path circuits comprising means including a continuity test means for completing a test circuit from the end of each of said plurality of shunt conductors and the end of each of said plurality of line control conductors.

31. A multistage electrical switching system acording to claim 30 also comprising a plurality of test ferreed devices associated respectively with said plurality of junctor control conductors, each of said test ferreed devices also having a first and second winding means associated therewith, said first winding means of each of said test ferreed devices being serially connected in a respective junctor control conductor, a plurality of test control conductors each including a relay contact and serially connecting said second winding means of a group of said test ferreed devices, said test ferreed devices being grouped in association respectively with said second sequence of grid networks, a group of test relay means for selectively controlling respectively said relay contacts in said plurality of test control conductors, and means including said pulse source for completing a test circuit control path from the end of each of said plurality of junctor control conductors and the end of each of said plurality of shunt conductors.

32. A multistage electrical switching system according to claim 31 also comprising means for testing said test circuit control path comprising means including said continuity test means for completing a test circuit from the end of each of said plurality of junctor control conductors and the end of each of said plurality of shunt conductors.

33. A multistage electrical switching system according to claim 31 also comprising fuse means having a particular operating threshold connected in each of the control links of said pluralities of interstage control links, in each of said line control conductors, in each of said junctor control conductors, in each of said shunt conductors, and in each of said test control conductors, auxiliary relay control means for simultaneously operating the relay means of each of said groups of selection relay means and said group of test relay means, means for selectively preventing the operation of one of said groups of relay means operated simultaneously with said auxiliary relay control means, and means including a source of fuse current of a magnitude greater than said operating threshold and less than the magnitude sufficient to operate said ferreed devices for completing a contact checking circuit between the end of each of said plurality of test control conductors and the end of each of said line control conductors.

34. A multistage electrical switching system according to claim 33 also comprising means including said source of fuse current for completing a contact checking circuit between the end of each of said plurality of test control conductors and the ends of each of said shunt conductors.

35. An electrical switching network comprising a first and a second plurality of switches; each of said switches comprising a plurality of ferreed devices each being operative responsive to the simultaneous energization of a first and a second winding means coupled thereto for establishing a transmission connection and being released responsive to the exclusive energization of only one of said first and second winding means for opening said transmission connection, said plurality of ferreed devices being arranged in rows and columns, a plurality of row and column control conductors including respectively said first and second winding means of said ferreed devices, and a common conducting means connecting one end of each of said row and column control conductors; a plurality of first terminal control conductors each having a relay contact therein connected to the other ends respectively of said column control conductors of said first plurality of switches, a plurality of second terminal control conductors each having a relay contact therein connected to the other ends respectively of said column control conductors of said second plurality of switches; a plurality of control links each having a relay contact therein interconnecting the row control conductors of the switches of said first plurality of switches and the row control conductors of the switches of said second plurality of switches; a plurality of groups of relay means for controlling respectively said relay contacts in said pluralities of first terminal control conductors, second terminal control conductors, and control links; and means for selectively energizing one of said relay means within each of said groups of relay means.

36. An electrical switching network comprising a plurality of switching stages each comprising an array of electrical contacting means arranged in rows and columns, each said contacting means having a first and a second winding means associated therewith and including contacts responsive to coincident energization of said first and second winding means for establishing a transmission connection, a plurality of row control circuit means for connecting the first winding means of the contacting means of each of said rows in series, a plurality of column control circuit means for connecting the second winding means of the contacting means of each of said columns in series, and a common conducting bus connecting one end of each of said plurality of row control circuit means to one end of each of said plurality of column control circuit means; a plurality of bidirectional current paths each including a row and column control circuit means of each of said stages and one of a plurality of interstage control links each having a relay contact therein; and a plurality of relays for selectively controlling said relay contacts for connecting a selected row control circuit means of each of said stages to a particular column control circuit means of the next succeeding stage.

37. A telephone switching network comprising a plurality of coordinate ferreed switch arrays; each of said switch arrays comprising a first plurality of coordinate control circuits, a second plurality of coordinate control circuits and a common conducting means interconnecting one end of each of said coordinate control circuits of said first and second pluralities; first control means including means connected to the other ends of the coordinate control circuits of the switch arrays for energizing a particular ferreed defined by the intersection of one of said first coordinate and one of said second coordinate control circuits; shunt means connected to said common conducting means; and second control means including gating means connected to said shunt means and also including said first coordinate control circuit for releasing said particular ferreed.

38. A telephone switching network comprising a plurality of coordinate ferreed switch arrays each including a first plurality of coordinate control circuits, a second plurality of coordinate control circuits and common conducting means interconnecting one end of each of said coordinate control circuits, a bipolar ferreed connected in series with each of said first plurality of coordinate control circuits, first control means connected to the other ends of said coordinate control circuits of said first and second plurality for selectively operating and releasing one of said ferreeds in said switch array and one of said bipolar ferreeds, and means including shunt control means connected to said common conducting means for selectively releasing said one ferreed in said coordinate switch array and said one bipolar ferreed.

39. A telephone switching network including a coordinate array of network ferreeds, first and second coordinate control conductors connected to control windings of said network ferreeds, common conducting means connected to one end of said first and second coordinate control conductors, a plurality of cut-off ferreeds each having its control winding connected in series with one of said first coordinate control conductors, first means including means for applying energizing signals to the other ends of said first and second coordinate control conductors for operating one of said network ferreeds and one of said cut-off ferreeds and second means including gating means connected to said common conducting means for releasing said one network ferreed and operating said one cut-off ferreed.

40. A telephone switching network in accordance with claim 39 wherein said first means includes relay means applying signals to said first and second coordinate control conductors and said second means includes relay means applying signals to said common conducting means and said relay means applying signals to said first coordinate control conductors.

41. A telephone switching network including a coordinate array of network ferreeds; first and second coordinate control conductors connected to said network ferreeds; common conducting means connected to one end of said first and second coordinate control conductors; a plurality of cut-off ferreeds each having its control winding connected in series with one of said first coordinate control conductors; and control means for selectively operating a particular network ferreed and a particular cut-off ferreed, for releasing said particular network ferreed and said particular cut-off ferreed, for operating said particular network ferreed and releasing said particular cut-off ferreed, and for releasing said particular network ferreed and operating said particular cut-off ferreed; said control means including means for selectively applying control potentials to the other ends of said first and second control conductors and means for selectively applying control potentials to said common conducting means.

References Cited by the Examiner

UNITED STATES PATENTS

| | | | |
|---|---|---|---|
| 3,002,067 | 9/1961 | Baldwin et al. | 179—27 |
| 3,005,072 | 10/1961 | Brown | 179—27.54 |
| 3,037,085 | 5/1962 | Lowry | 179—27.54 |
| 3,053,936 | 9/1962 | Steinbuch et al. | 340—166 |
| 3,055,982 | 9/1962 | Kowalik | 179—18 |

ROBERT H. ROSE, *Primary Examiner.*

WALTER L. LYNDE, *Examiner.*